United States Patent
Okai et al.

(10) Patent No.: US 9,997,297 B2
(45) Date of Patent: Jun. 12, 2018

(54) MULTILAYER ELECTRONIC COMPONENT

(71) Applicant: TDK CORPORATION, Tokyo (JP)

(72) Inventors: Keisuke Okai, Tokyo (JP); Hirobumi Tanaka, Tokyo (JP)

(73) Assignee: TDK CORPORATION, Tokyo (JP)

(*) Notice: Subject to any disclaimer, the term of this patent is extended or adjusted under 35 U.S.C. 154(b) by 0 days. days.

(21) Appl. No.: 15/264,962

(22) Filed: Sep. 14, 2016

(65) Prior Publication Data
US 2017/0076869 A1 Mar. 16, 2017

(30) Foreign Application Priority Data

Sep. 15, 2015 (JP) ................................. 2015-182051
Jun. 29, 2016 (JP) ................................. 2016-129201

(51) Int. Cl.
| | | |
|---|---|---|
| *H01G 4/30* | (2006.01) | |
| *H01G 4/005* | (2006.01) | |
| *H01G 4/228* | (2006.01) | |
| *H01G 5/16* | (2006.01) | |
| *H01G 5/013* | (2006.01) | |
| *H01G 5/011* | (2006.01) | |

(52) U.S. Cl.
CPC .............. *H01G 5/16* (2013.01); *H01G 4/005* (2013.01); *H01G 4/228* (2013.01); *H01G 4/30* (2013.01); *H01G 5/011* (2013.01); *H01G 5/0134* (2013.01)

(58) Field of Classification Search
CPC ........ H01G 4/30; H01G 4/008; H01G 4/1245; H01G 4/232; H01G 4/242
See application file for complete search history.

(56) References Cited

U.S. PATENT DOCUMENTS

| | | |
|---|---|---|
| 4,347,650 A | 9/1982 | Mc Larney et al. |
| 2014/0211369 A1* | 7/2014 | Sasabayashi ........ H01G 4/0085 361/301.4 |
| 2014/0301014 A1* | 10/2014 | Kim ......................... H01G 4/30 361/301.4 |
| 2017/0076864 A1* | 3/2017 | Okai ........................ H01G 4/30 |
| 2017/0076865 A1* | 3/2017 | Tanaka ................... H01G 4/224 |
| 2017/0076866 A1* | 3/2017 | Okai ..................... H01G 4/1245 |
| 2017/0076867 A1* | 3/2017 | Okai ........................ H01G 4/30 |
| 2017/0076868 A1* | 3/2017 | Noda ....................... H01G 4/30 |
| 2017/0076870 A1* | 3/2017 | Noda ....................... H01G 4/30 |

FOREIGN PATENT DOCUMENTS

| | | |
|---|---|---|
| JP | H02-30570 B2 | 7/1990 |
| JP | H11-340081 A | 12/1999 |

* cited by examiner

*Primary Examiner* — Dion R Ferguson
(74) *Attorney, Agent, or Firm* — Oliff PLC

(57) ABSTRACT

A multilayer electronic component includes an element body having internal electrode layers and dielectric layers. These are substantially parallel to a plane including a first axis and a second axis and are alternately laminated along a third axis direction. Side surfaces oppositely facing in the first axis direction are respectively equipped with an insulating layer. End surfaces facing each other in the second axis direction are respectively equipped with an external electrode. End portions in the first axis direction of the internal electrode layers are recessed from end portions in the first axis direction of the dielectric layers to an inner side along the first axis direction. The retraction distances are varied at a predetermined range in each layer of the internal electrode layers.

6 Claims, 10 Drawing Sheets n-TH LAYER n+1-TH LAYER

MULTILAYER ELECTRONIC COMPONENT

BACKGROUND OF THE INVENTION

1. Field of the Invention

The present invention relates to a multilayer electronic component.

2. Description of the Related Art

In recent years, a demand for miniaturization of electronic parts associated with the high densification of electronic circuits used in digital electronic devices such as mobile phones has increased, and the miniaturization and capacity enlargement of multilayer electronic components constituting the circuits have been rapidly advanced.

To increase use efficiency of electrode materials, electrostatic capacity, accuracy, or the like, Patent Document 1 proposes a multilayer ceramic capacitor having no structure of side gaps. However, this capacitor has a problem in low voltage endurance, since internal electrodes are exposed to side surfaces of a ceramic sintered body.

Also, when the insulating layer becomes thinner, electric field becomes easy to concentrate on an end portion of internal electrode layers, and insulation resistance tends to decrease.

As shown in Patent Document 2, a multilayer ceramic electronic component equipped with side gap is also known. In the prior art of the multilayer ceramic electronic component having side gaps, conductive layers need to intrude into the inner side from side surfaces of a ceramic sintered body so as to enhance insulation withstand voltage, and its intrusion amount is tried to be uniform. The present inventors, however, have found out that the following problem occurs: mechanical strength of ceramic layers where conductive layers are not present decreases as the ceramic layers become thinner; structural defects (cracks or delamination) become easy to occur in a formation step of insulating layers; and decrease in insulation resistance is consequently hard to be prevented.

Patent Document 1: Japanese Examined Patent Publication No. 2-30570

Patent Document 2: JP 11-340081 A

SUMMARY OF THE INVENTION

The present invention has been made in view of the above circumstances, and an object thereof is to provide a multilayer electronic component having favorable insulation resistance.

Means for Solving Problem

In order to achieve the above object, the multilayer electronic component of the present invention is as follows.

[1] A multilayer electronic component includes an element body having internal electrode layers and dielectric layers, both of which are substantially parallel to a plane including a first axis and a second axis and are alternately laminated along a third axis direction, wherein a pair of end surfaces (side surfaces) facing each other in the first axis direction of the element body is respectively equipped with an insulating layer, a pair of end surfaces facing each other in the second axis direction of the element body is respectively equipped with an external electrode electrically connected to the internal electrode layers, end portions in the first axis direction of the internal electrode layers are recessed at predetermined retraction distances from end portions in the first axis direction of the dielectric layers to an inner side along the first axis direction, and the retraction distances are varied at a predetermined range in each layer of the internal electrode layers.

According to the present invention, since the retraction distances are varied at a predetermined range in each layer of the internal electrode layers, internal electrode layers in different layers can be effectively prevented from contacting each other at both end portions in the first axis direction of the internal electrode layers, and a distance of the internal electrode layers in different layers can be made sufficient. If the dielectric layers are made thinner, the multilayer electronic component having favorable insulation resistance can be thus provided.

As a specific aspect of [1] above, the following aspects are exemplified.

[2] The multilayer electronic component according [1], in which a CV value is 0.05 to 1.0, where the CV value denotes a variance degree of the retraction distances.

[3] The multilayer electronic component according to [1] or [2], in which a Q value is 0.004 to 0.300, where the $Q$ value=$td_k^2/(td_k^2+|d_{k+1}-d_k|^2)$, $td_k$ denotes a thickness of the dielectric layer between the internal electrode layer in k-th layer and the internal electrode layer in (k+1)-th layer, $d_k$ denotes a retraction distance of the internal electrode layer in k-th layer, and $d_{k+1}$ denotes a retraction distance of the internal electrode layer in (k+1)-th layer.

[4] The multilayer electronic component according to any of [1] to [3], in which the insulating layer contains Si and Ba.

[5] The multilayer electronic component according to any of [1] to [4], in which nonconductive portions are present between end portions in the first axis direction of the internal electrode layers and the insulating layer.

[6] The multilayer electronic component according to [5], in which the nonconductive portions contain an oxide of an element constituting the internal electrode layers.

[7] A method for manufacturing the multilayer electronic component, the method including a step of obtaining a green laminate by laminating a green sheet having an internal electrode pattern layer that is continuous in a first axis direction and is substantially parallel to a plane including a first axis and a second axis formed in a third axis direction, a step of obtaining a green chip by cutting the green laminate so as to obtain a cutting plane parallel to a plane including a second axis and a third axis, a step of obtaining an element body having internal electrode layers and dielectric layers alternately laminated by calcining the green chip, a step of obtaining a ceramic sintered body having an insulating layer formed by coating and baking a paste for insulating layer on an end surface in the first axis direction of the element body, a step of obtaining a multilayer electronic component where an external electrode is formed by baking a paste for external electrode layer on an end surface in the second axis direction of the ceramic sintered body, in which end portions in the first axis direction of the internal electrode layers are recessed at predetermined retraction distances from end portions in the first axis direction of the dielectric layers to an inner side along the first axis direction, the retraction distances are varied at a predetermined range in each layer of the internal electrode layers.

BRIEF DESCRIPTION OF THE DRAWINGS

FIG. 5Ab is a plan view illustrating a portion of the (n+1)-th internal electrode pattern layer.

DESCRIPTION OF THE PREFERRED EMBODIMENTS

Figure 1:
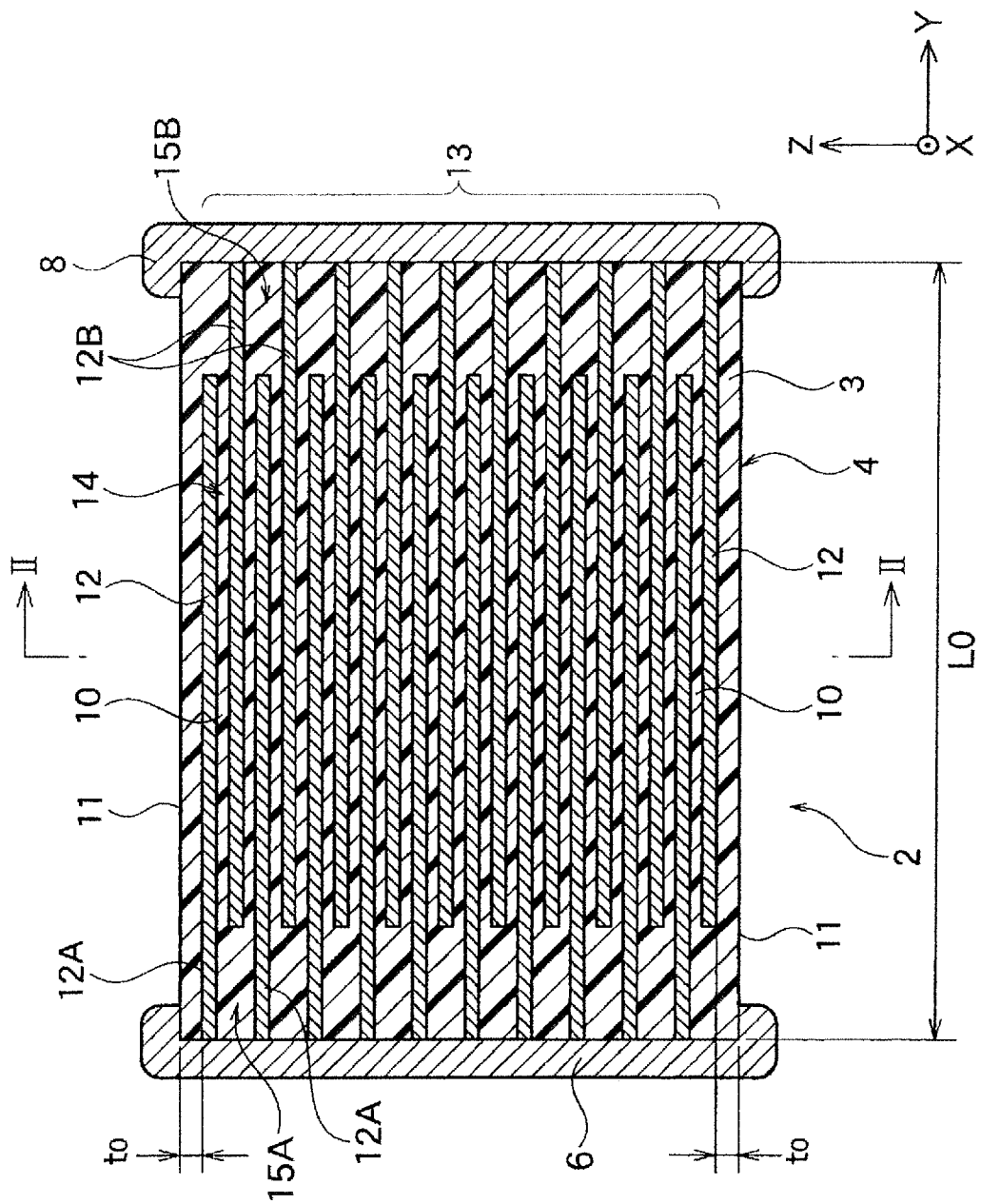
FIG. 1 is a schematic cross-sectional view of the multilayer ceramic capacitor according to an embodiment of the present invention.

The present invention will be described in detail based on the present embodiment with reference to the drawings, but the present invention is not limited to the embodiment to be described below.

In addition, the constituents to be described below include those that can be easily presumed by those skilled in the art and those that are substantially the same with one another. Furthermore, the constituents to be described below can be appropriately combined with one another.

Hereinafter, the present invention will be described based on the embodiment illustrated in the drawings.

Overall Configuration of Multilayer Ceramic Capacitor

As an embodiment of the laminated electronic component according to the present embodiment, the overall configuration of a multilayer ceramic capacitor will be described.

Figure 2:
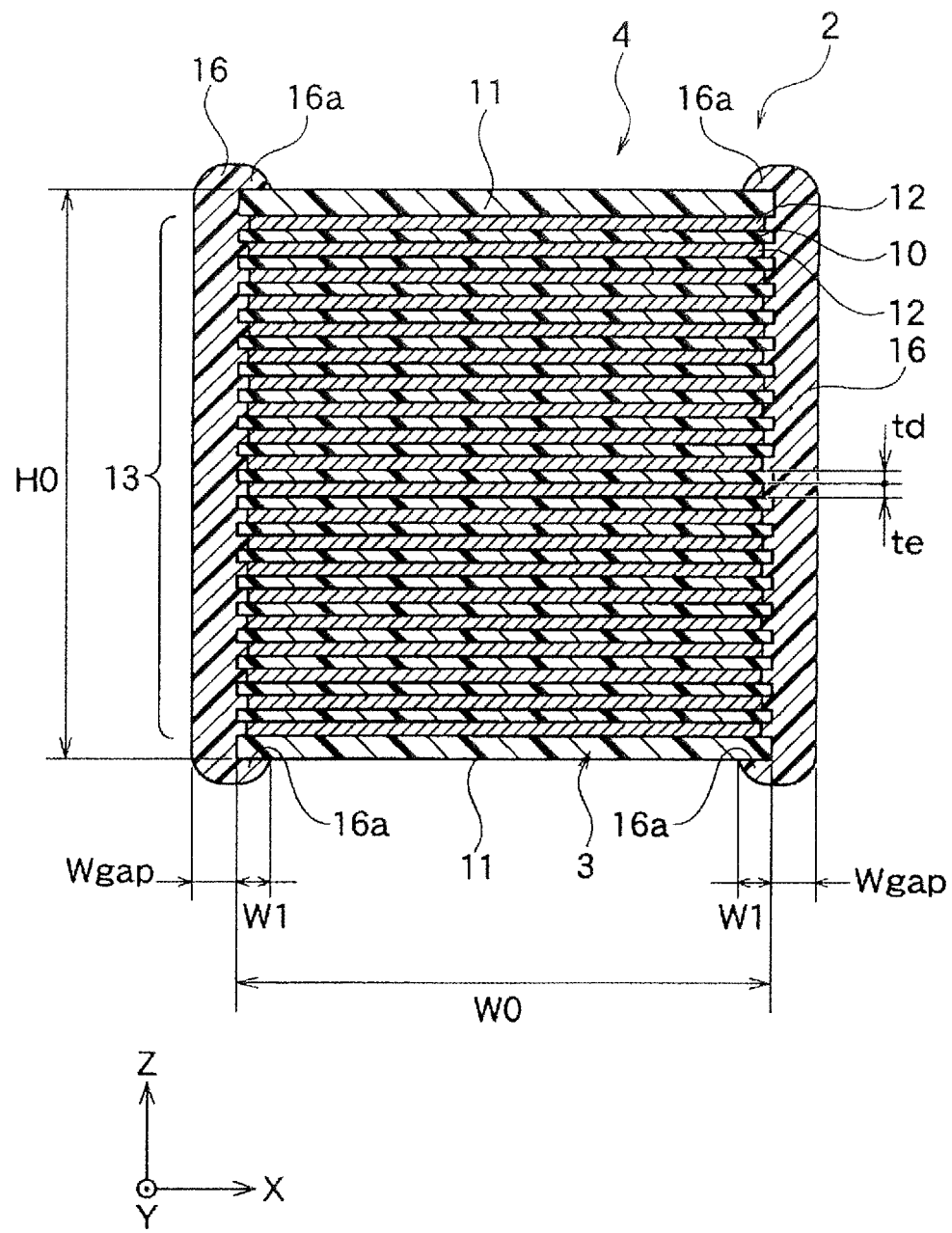
FIG. 2 is a cross-sectional view taken along the line II-II illustrated in FIG. 1.

As illustrated in FIG. 1, a multilayer ceramic capacitor 2 according to the present embodiment includes a ceramic sintered body 4, a first external electrode 6, and a second external electrode 8. In addition, as illustrated in FIG. 2, the ceramic sintered body 4 has an element body 3 and an insulating layer 16.

The element body 3 has an inner dielectric layer 10 and an internal electrode layer 12 which are substantially parallel to a plane including an X-axis and a Y-axis, and the internal electrode layer 12 is alternately laminated between the inner dielectric layers 10 along a Z-axis direction. Here, the term "substantially parallel" means that the most part is parallel but there may be a part that is not parallel, and it intends that the internal electrode layer 12 and the inner dielectric layer 10 may be a little irregular or tilted.

The portion at which the inner dielectric layer 10 and the internal electrode layer 12 are alternately laminated is an interior region 13.

In addition, the element body 3 has an exterior region 11 on both end surfaces in the laminating direction Z (Z-axis) thereof. The exterior region 11 is formed by laminating a plurality of outer dielectric layers that are thicker than the inner dielectric layer 10 constituting the interior region 13.

Incidentally, hereinafter, the "inner dielectric layer 10" and the "outer dielectric layer" are collectively referred to as the "dielectric layer" in some cases.

The material for the inner dielectric layer 10 and the dielectric layer constituting the exterior region 11 may be the same as or different from each other, and it is not particularly limited, and for example, they may be constituted to contain a dielectric material having a perovskite structure such as $ABO_3$ or an alkali niobate-based ceramic as a main component.

In $ABO_3$, for example, A is at least one kind such as Ca, Ba, or Sr, and B is at least one kind such as Ti or Zr. The molar ratio of AB is not particularly limited, and it is from 0.980 to 1.020.

In addition to this, examples of an accessory component may include silicon dioxide, aluminum oxide, magnesium oxide, alkali metal compound, alkaline earth metal compound, manganese oxide, a rare earth element oxide, and vanadium oxide, but it is not limited to these. The content thereof may also be appropriately determined in accordance with the composition and the like.

Incidentally, it is possible to lower the calcination temperature by using silicon dioxide and aluminum oxide as the accessory component. In addition, the lifespan can be improved by using magnesium oxide, alkali metal compound, alkaline earth metal compound, manganese oxide, rare earth element oxide, and vanadium oxide as the accessory component.

The number of lamination of the inner dielectric layer 10 and the outer dielectric layer may be appropriately determined in accordance with the application and the like.

One internal electrode layer 12 to be alternately laminated has a lead portion 12A that is electrically connected to the inner side of a first external electrode 6 formed on the outer side of a first end portion in a Y-axis direction of the ceramic sintered body 4. In addition, the other internal electrode layer 12 has a lead portion 12B that is electrically connected to the inner side of a second external electrode 8 formed on the outer side of a second end portion in a Y-axis direction of the ceramic sintered body 4.

The interior region 13 has a capacity region 14 and lead regions 15A and 15B. The capacity region 14 is a region in which the internal electrode layer 12 is laminated along the laminating direction so as to sandwich the inner dielectric layer 10. The lead region 15A is a region located between the lead portions 12A of the internal electrode layers 12 to be connected to the external electrodes 6. The lead region 15B is a region located between the lead portions 12B of the internal electrode layers 12 to be connected to the external electrodes 8.

The conductive material contained in the internal electrode layer 12 is not particularly limited, and it is possible to use a metal such as Ni, Cu, Ag, Pd, Al, or Pt and an alloy thereof. As a Ni alloy, an alloy of Ni with one or more kinds of elements selected from Mn, Cr, Co, or Al is preferable, and the Ni content in the alloy is preferably 95 wt % or more. Incidentally, various kinds of trace components such as P may be contained in Ni or a Ni alloy at about 0.1 wt % or less.

The internal electrode layer 12 may be formed by using a commercially available electrode paste, and the thickness of the internal electrode layer 12 may be appropriately determined in accordance with the application and the like.

As illustrated in FIG. 2, the both end surfaces in the X-axis direction of the ceramic sintered body 4 are equipped with the insulating layers 16 covering the end surfaces of the internal electrode layers 12 of the element body 3.

In the present embodiment, the end portions in the X-axis direction of the internal electrode layers 12 sandwiched between the inner dielectric layers 10 adjacent in the laminating direction (Z-axis direction) are recessed on the end surface in the X-axis direction of the element body 3, namely, at the predetermined retraction distances from the X-axis direction end portions to an inner side of the inner dielectric layers 10. The retraction distances are varied at a predetermined range in each layer of the internal electrode layers 12.

Here, the retraction distance means a distance from the end portion in the X-axis direction of the inner dielectric layer 10 to the end portion in the X-axis direction of the internal electrode layer 12. When a nonconductive portion 18 mentioned below is present between the end portion in the X-axis direction of the internal electrode layer 12 and the insulation layer 16, the retraction distance also means a distance from the end portion in the X-axis direction of the inner dielectric layer 10 to the end portion in the X-axis direction of the internal electrode layer 12.

Incidentally, the end portion of the inner dielectric layer 10 and the internal electrode layer 12 may have irregularities, and in this case, an outermost portion of the inner dielectric layer 10 and the internal electrode layer 12 is standard. That is, at the end portion in the X-axis direction of the inner dielectric layer 10, the retraction distance means a distance from an outermost portion in the X-axis direction of the inner dielectric layer 10 to an outermost portion in the X-axis direction of the internal electrode layer 12.

Incidentally, in the present embodiment, not all of the internal electrode layers 12 need to be recessed inside at a predetermined range, and some of the internal electrode layers 12 may be exposed on the end surface in the X-axis direction of the element body 3.

For example, a variance degree of the retraction distances is represented by a CV value. The CV value is a ratio between a standard deviation and a mean (standard deviation/mean). A method for calculating the CV value of the variance degree of the retraction distances is as follows.

Figure 3A:
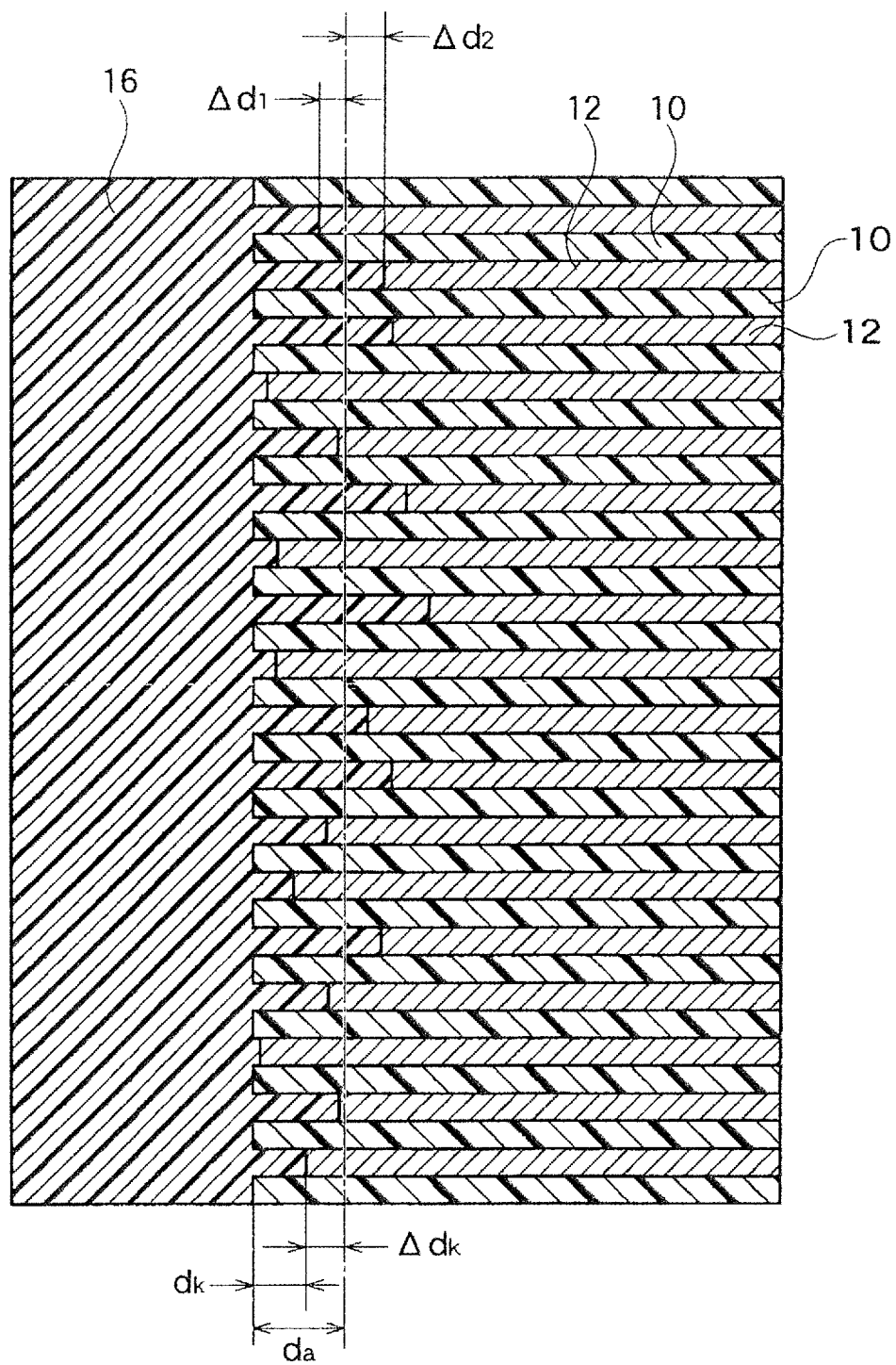
FIG. 3A is an enlarged fragmentary view of FIG. 2.

As illustrated in FIG. 3A, $\Delta d_k = |d_k - d_a|$ is defined, where $d_k$ µm denotes a retraction distance in k-th layer, and $d_a$ µm denotes an average value of retraction distances of the element body 3 having the N-layer internal electrode layers. Then, a standard deviation of the retraction distances is represented by $(\Delta d_1^2 + \Delta d_2^2 + \ldots \Delta d_k^2 + \ldots \Delta d_N^2)^{1/2}$. The CV value is accordingly represented by the following formula (1).

Formula 1

$$CV \text{ value} = \frac{\sqrt{\frac{1}{N}\sum_{k=1}^{N}(d_k - d_a)^2}}{d_a} \quad (1)$$

In the present embodiment, the CV value is preferably 1.0 or less, and is more preferably 0.05 to 1.0. This can obtain a multilayer electronic component having favorable insulation resistance.

The present inventors consider the reason why this effect can be obtained as follows. When the inner dielectric layer 10 becomes thinner, the internal electrode layer 12 intruded inside from the element body 3 is generally easy to cause disconnection of the internal electrode layers 12 due to contact of each inner dielectric layer 10, or cause extension or structural defect of the internal electrode layers 12 due to handling etc. in formation step of the insulating layer 16. Thus, the end portions in the X-axis direction of the internal electrode layers 12 are the cause of decrease in insulation resistance.

Here, "extension of the internal electrode layer 12" is a phenomenon where the internal electrode layer 12 extends when an extra external force is applied to a side surface where the internal electrode layer 12 of the element body 3 is exposed. This extra external force includes an external force when a large amount of the element bodies 3 is handled and the element bodies 3 collide with each other, an external force applied to a side surface of the element body 3 when the element body 3 is picked up by tweezer, and the like. The extension of the internal electrode layer 12 may cause a short circuit as the adjacent internal electrode layers 12 are connected.

The present embodiment is characterized in that the retraction distances of the internal electrode layers 12 are intentionally varied at the end portions in the X-axis direction of the internal electrode layers 12, which are a factor of extension or structural defect of the internal electrode layers 12. The variance of the retraction distances of the end portions in the X-axis direction of the internal electrode layers 12 prevents extension or structural defect of the internal electrode layers 12 and is considered to enable prevention of decrease in insulation resistance.

The variance of the retraction distances of the end portions in the X-axis direction of the internal electrode layers 12 also contributes to prevent electric field from concentrating on the end portions in the X-axis direction of the internal electrode layers 12. In particular, even if the inner dielectric layer 10 is thinned to, for example, about 0.5 µm or less, it is possible to prevent decrease in insulation resistance and electric field concentration.

In the present embodiment, since the retraction distances at the end portions in the X-axis direction of the internal electrode layers 12 are varied, the internal electrode layers 12 in different layers can be prevented from contacting each other at both end portions in the X-axis direction of the internal electrode layers 12, and the distances of the internal electrode layers 12 in different layers can be made sufficient. It is thus considered that decrease in insulation resistance at the time of thinning the inner dielectric layer 10 can be prevented and short circuit defective rate can be lowered.

The retraction of the X-axis direction end portion of the internal electrode layer 12 is formed, for example, by the difference in sintering shrinkage factor between the material to form the internal electrode layer 12 and the material to form the inner dielectric layer 10. The retraction distance of the end portion in the X-axis direction of the internal electrode layer 12 can be also adjusted by polishing, such as barrel polishing, the end surfaces in the X-axis direction of the element body 3 before forming the insulating layer 16.

A method for varying the retraction distances of the internal electrode layers 12 is not limited. For example, as described later, the retraction distances of the internal electrode layers 12 can be varied by changing a content of common material at every the internal electrode layer 12 and etching the element body 3.

That is, the internal electrode layers 12 having a large content of common material are hard to be shaved, while the internal electrode layers 12 having a small content of common material are easy to be shaved. Since each of the internal electrode layers 12 is different in how easy it is to be shaved, the retraction distances of the internal electrode layers 12 can be varied in each internal electrode layer 12.

The variance degree of the retraction distances of the end portions in the X-axis direction of the internal electrode layers 12 can be changed by changing concentration of etching solution, etching time, or the like.

In addition, by changing etching rate of ion milling, the retraction distances of the end portions in the X-axis direction of the internal electrode layers 12 can be varied, and the variance degree can be changed.

Also, by forming nonconductive portions 18 mentioned below at the end portions in the X-axis direction of the internal electrode layers 12, the variance degree of the retraction distances of the end portions in the X-axis direction of the internal electrode layers 12 can be changed, and the variance degree can be changed.

Figure 3B:
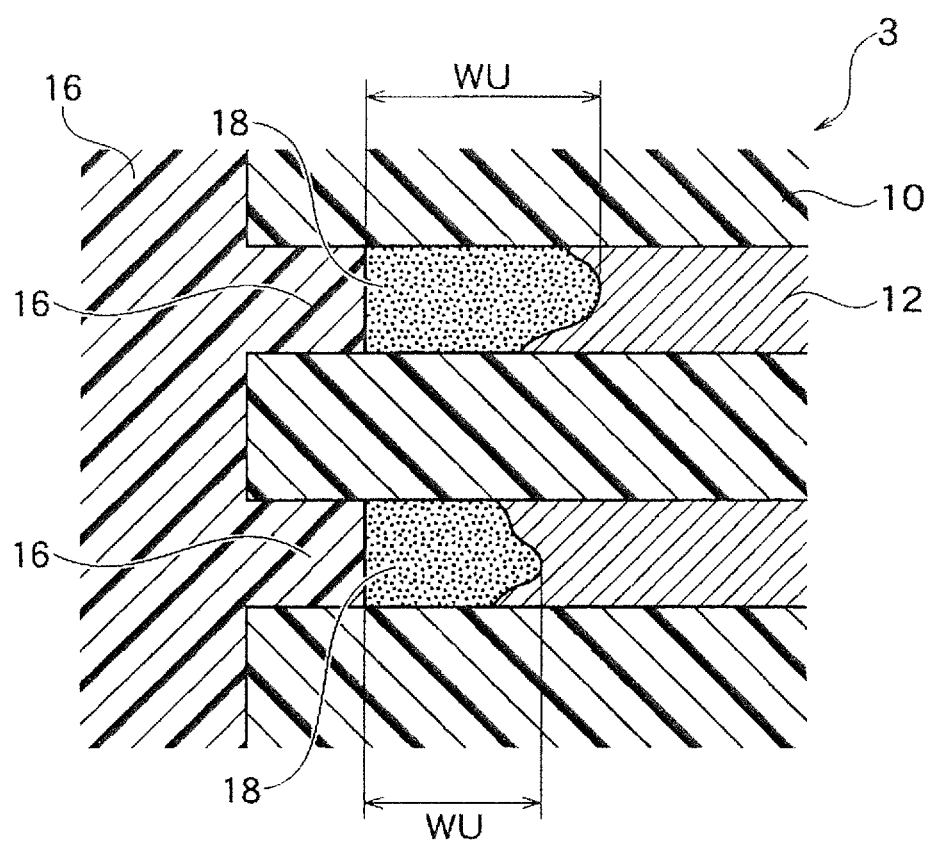
FIG. 3B is an enlarged fragmentary view of FIG. 2.

In the present embodiment, as shown in FIG. 3B, the nonconductive portions 18 are preferably present between the end portions in the X-axis direction of the internal electrode layer 12 and the insulating layer 16. This can vary the retraction distances at the end portions in the X-axis direction of the internal electrode layers 12 in each internal electrode layers 12, prevent the internal electrode layers 12 in different layers from contacting each other at both end portions in the X-axis direction of the internal electrode layers 12, and achieve sufficient distances of the internal electrode layers 12 in different layers. It is thus possible to decrease short circuit defective rate at the time of thinning the inner dielectric layer 10.

In the present embodiment, the nonconductive portions 18 are preferably present between all of the end portions in the X-axis direction of the internal electrode layers 12 and the insulating layer 16, but there may be a layer where no nonconductive layer is present.

The nonconductive portion 18 is composed of any component, such as oxide, nitride, alloy, or mixture of these of element constituting the internal electrode layer 12, but the component more preferably contains an oxide of element constituting the internal electrode layer 12. This improves adhesion between both end portions of the internal electrode layers 12 and the insulating layer 16, and insulation resistance becomes more favorable. For example, the nonconductive portion 18 preferably contains NiO when the internal electrode layers 12 contains Ni.

The insulating layers 16 according to the present embodiment cover both end surfaces (side surfaces) in the X-axis direction of the element body 3. It is preferable that the insulating layers 16 according to the present embodiment integrally have insulating layer extension portions 16a covering both ends in the X-axis direction of the end surfaces in the Z-axis direction of the element body 3 and/or both end portions in the X-axis direction on the end surfaces in the Y-axis direction of the element body 3. Although not illustrated, both ends in the Z-axis direction of the external electrodes 6 and 8 cover both ends in the Y-axis direction of the insulating layer extension portions 16a.

In the present embodiment, both ends in the X-axis direction of the external electrodes 6 and 8 shown in FIG. 1 do not cover both ends in the Y-axis direction of the insulating layers 16 shown in FIG. 2 from both sides in the X-axis direction, but may cover them.

The softening point of the insulating layer 16 is preferably 500° C. to 1000° C. This makes it possible to reduce influence of structural defect that can be generated in the before and after the step.

The insulating layer 16 of the present embodiment is composed of any component, such as ceramic, aluminum, glass, titanium, and resin, but the component preferably contains Si and Ba. The adhesion strength between the element body 3 and the insulating layer 16 becomes favorable by containing Si and Ba in the insulating layer 16. As a result, resistance against external stress due to deflection can be achieved even if the thickness of the inner dielectric layer 10 is smaller. It is considered that this is because the reaction phase is formed at an interface between the insulating layer 16 and the element body 3. Here, the reaction phase is where at least one of the constituents of the insulating layer 16 is dispersed at the inner dielectric layer 10.

With regard to the acknowledgement of reaction phase, for example, the STEM-EDS analysis of the Si element at the interface between the dielectric layer and insulating layer of the ceramic sintered body 4 is conducted to obtain the mapping data of the Si element, and the place at which the Si element is present is acknowledged as the reaction phase.

By covering the end surface in the X-axis direction of the element body 3 with the insulating layer 16, not only the insulating properties are enhanced but also the durability and moisture resistance to the environmental impact from the outside are enhanced. Also, the insulating layer 16 covers the end surface in the X-axis direction of the fired element body 3, and thus a uniform insulating layer 16 having a gap portion (side gap) whose width is small can be formed.

The material of the external electrodes 6 and 8 is not limited either, but a well-known conductive material, such as at least one kind of Ni, Pd, Ag, Au, Cu, Pt, Rh, Ru, Ir etc., alloy thereof, and conductive resin, can be used. The thickness of the external electrodes 6 and 8 may be appropriately determined in accordance with the application and the like.

Incidentally, in FIG. 1, the X-axis, the Y-axis, and the Z-axis are perpendicular to one another, the Z-axis coincides with the laminating direction of the inner dielectric layer 10 and the internal electrode layer 12, the Y-axis coincides with the direction in which the lead regions 15A and 15B (lead portions 12A and 12B) are formed.

In the present embodiment, as illustrated in FIG. 2, the section from the end surface in the X-axis direction of the element body 3 to the outer surface of the insulating layer 16 along the width direction (X-axis direction) of the ceramic sintered body 4 in the insulating layer 16 is adopted as the gap portion.

In the present embodiment, the width Wgap in the X-axis direction of the gap portion coincides with the dimensions from the end surface in the X-axis direction of the element body 3 to the end surface in the X-axis direction of the insulating layer 16 along the width direction (X-axis direction) of the ceramic sintered body 4, but the width Wgap is not necessarily uniform along the Z-axis direction but may be a bit varied. The width Wgap is preferably from 0.1 μm to 40 μm, which is extremely smaller than the width W0 of the element body 3.

In the present embodiment, it is possible to significantly decrease the width Wgap as compared to the prior art, moreover, the retraction distances of the internal electrode layers 12 are sufficiently small. Hence, in the present embodiment, it is possible to obtain a multilayer capacitor having a great capacity while being compact.

Incidentally, the width W0 of the element body 3 coincides with the width along the X-axis direction of the inner dielectric layer 10.

By setting Wgap to be within the above range, a decrease in electrostatic capacity is small even when the ceramic sintered body 4 is more compact as well as cracking hardly occurs.

In the present embodiment, as illustrated in FIG. 2, the insulating layer extension portions 16a covering both ends in the X-axis direction on both end surfaces in the Z-axis direction of the element body 3 are integrally formed with the insulating layers 16 at both ends in the Z-axis direction of the insulating layers 16. $1/30 \leq W1/W0 < 1/2$ is preferably satisfied, where W1 and W0 are respectively a width in the X-axis direction of the insulating layer extension portions 16a from both end surfaces in the X-axis direction of the element body 3.

Figure 3C:
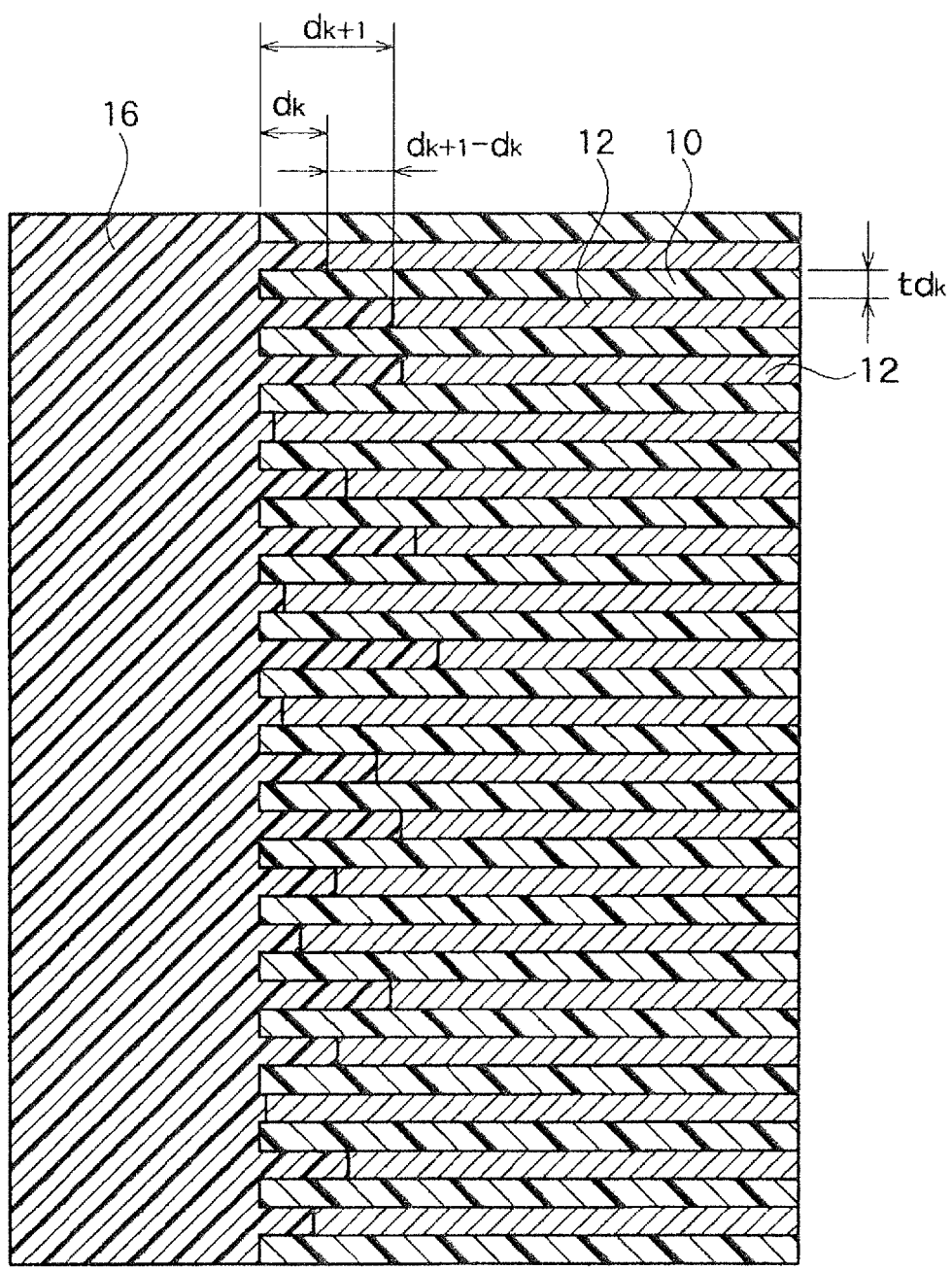
FIG. 3C is an enlarged fragmentary view of FIG. 2.

As illustrated in FIG. 3C, $td_k$ denotes a thickness of the inner dielectric layer 10 between the internal electrode layer 12 in k-th layer and the internal electrode layer 12 in (k+1)th layer, $d_k$ denotes a retraction distance of the internal electrode layer 12 in k-th layer, and $d_{k+1}$ denotes a retraction distance of the internal electrode layer 12 in (k+1)th layer. In the present embodiment preferably, a distance between the end portion in the X-axis direction of the internal electrode layer 12 in k-th layer and the end portion in the X-axis direction of the internal electrode layer 12 in (k+1)th layer is favorable. The following formula (2) for quantifying this respect can be pointed out.

the Q value=$td_k^2/(td_k^2 + |d_{k+1} - d_k|^2)$ (2)

The Q value of the formula (2) is a ratio of a square of "a thickness of a dielectric layer between an internal electrode layer in k-th layer and an internal electrode layer in (k+1)th layer" and "a distance between an end portion in the X-axis direction of an internal electrode layer in k-th layer and an end portion in the X-axis direction of an internal electrode layer in (k+1)th layer". In the present embodiment, the Q value is preferably 0.004 to 0.300, and is more preferably 0.015 to 0.300.

When the Q value is 0.004 or more, the distance between the end portions of the internal electrode layers 12 is not too long with respect to the thickness of the inner dielectric layer 10, a capacity area becomes sufficient, and electrostatic capacity becomes favorable, compared with when the Q value is less than 0.004. When the Q value is 0.015 or more, electrostatic capacity becomes more favorable. When the Q value is 0.300 or less, the distance between the end portions of the internal electrode layers 12 is not too short with respect to the thickness of the inner dielectric layer 10, electric field is hard to concentrate on the end portions in the X-axis direction of the internal electrode layers 12, and an insulation breakdown voltage defective rate becomes favorable, compared with when the Q value is more than 0.300.

Like the present embodiment, the retraction distances of the end portions in the X-axis direction of the internal electrode layers 12 are varied in every layer of the internal electrode layers 12 and the Q value is within the above range, which can prevent the internal electrode layers 12 in different layers from contacting with each other at both end portions in the X-axis direction of the internal electrode layers 12 and achieve a sufficient distance of the internal electrode layers 12 in different layers. Thus, a short circuit defective rate at the time of thinning the inner dielectric layer 10 can be lowered.

In FIG. 3B, the nonconductive portions 18 are formed at the end portions in the X-axis direction of each internal electrode layer 12 within the range of a predetermined width WU from the end portions in the X-axis direction of the internal electrode layers 12. Incidentally, as illustrated in FIG. 3B, the end portions of the nonconductive portions 18 may have irregularities, and the width WU is a widest width of one nonconductive portion 18.

The widths WU of the nonconductive portion 18 may be varied in every internal electrode layer 12.

The nonconductive portion 18 according to the present embodiment can be obtained by performing oxidation treatment, nitriding treatment, alloying treatment due to sputtering, or the like against the end portion of the internal electrode layer 12. The width WU of the nonconductive portion 18 can be controlled by changing retention time, sputtering time etc. at the time of performing oxidation treatment or nitriding treatment against the end portion of the internal electrode layer 12.

The widths Wgap at both sides in the X-axis direction of the ceramic sintered body 4 may be mutually the same or different. Also, the widths W1 at both sides in the X-axis direction of the ceramic sintered body 4 may be mutually the same or different. Furthermore, the average values $d_a$ of the retraction distances of the element body 3 may be mutually the same or different.

It is preferable that the insulating layer 16 does not widely cover the both end surfaces in the Y-axis direction of the element body 3 illustrated in FIG. 1. This is because it is required that the external electrodes 6 and 8 are formed on the both end surfaces in the Y-axis direction of the element body 3 and connected to the internal electrode layers 12. The external electrodes 6 and 8 according to the present embodiment may cover the insulating layer extension portions 16a.

The thickness "td" of the inner dielectric layers 10 is not particularly limited, but is preferably 0.1 μm to 5.0 μm.

The thickness "te" of the internal electrode layer 12 is not particularly limited, but is preferably 0.1 μm to 5.0 μm.

The thickness "to" of the exterior region 11 is not particularly limited, but is preferably 0.1 to 5.0 μm.

Method for Manufacturing Multilayer Ceramic Capacitor

Next, a method for manufacturing the multilayer ceramic capacitor 2 as an embodiment of the present invention will be specifically described. The multilayer ceramic capacitor 2 is manufactured by making green chips with an ordinary printing method, sheet method, or the like using paste, firing this, applying and baking paste for insulating layer thereto to form the insulating layer 16, and performing baking after printing or transcripting the external electrodes 6 and 8.

First, a paste for inner green sheet and a paste for outer green sheet are prepared in order to manufacture an inner green sheet 10a to constitute the inner dielectric layer 10 illustrated in FIG. 1 after calcination and an outer green sheet 11a to constitute the outer dielectric layer illustrated in FIG. 1 after calcination.

The paste for inner green sheet and the paste for outer green sheet are usually composed of an organic solvent-based paste obtained by kneading a ceramic powder with an organic vehicle or an aqueous paste.

The raw material for the ceramic powder can be appropriately selected from various kinds of compounds to be composite oxides or oxides, for example, carbonates, nitrates, hydroxides, and organic metal compounds are used by being mixed. In the present embodiment, the raw material for the ceramic powder is used as a powder having an average particle size of 0.45 μm or less and preferably about from 0.1 to 0.3 μm. Incidentally, it is desirable to use a powder finer than the thickness of the green sheet in order to obtain a significantly thin inner green sheet.

The organic vehicle is one that is obtained by dissolving a binder in an organic solvent. The binder used in the organic vehicle is not particularly limited, and it may be appropriately selected from various kinds of common binders such as ethyl cellulose and polyvinyl butyral. The organic solvent to be used is also not particularly limited, and it may be appropriately selected from various kinds of organic solvents such as an alcohol, acetone, and toluene.

In addition, the paste for green sheet may contain additives selected from various kinds of dispersants, plasticizers, dielectrics, accessory component compounds, glass frits, and insulating materials.

Examples of the plasticizer may include an ester of phthalic acid such as dioctyl phthalate or benzyl butyl phthalate, adipic acid, an ester of phosphoric acid, and a glycol.

Next, a paste for internal electrode layer is prepared in order to manufacture an internal electrode pattern layer 12$a$ to constitute the internal electrode layers 12 illustrated in FIG. 1 after calcination. The paste for internal electrode layer is prepared by kneading a conductive material composed of various kinds of conductive metals or alloys described above with the organic vehicle described above.

When using Ni as the conductive material, Ni powder prepared by using a commercially available CVD method, wet chemical reduction method, or the like may be used.

In the present embodiment, first, the paste for internal electrode layer is prepared by kneading a conductive material composed of various kinds of conductive metals or alloys described above with the organic vehicle described above.

Next, a common material is added to the paste for internal electrode layer and kneaded to prepare a paste for internal electrode layer for n-th layer.

Aside from the above, a common material is added to the paste for internal electrode layer and kneaded to prepare a paste for internal electrode layer for (n+1)-th layer.

When the variance of the retraction distances at the end portions of the internal electrode layers 12 is controlled by an amount of the common materials, a content of the common material of the paste for internal electrode layer for n-th layer and a content of the common material of the paste for internal electrode layer for (n+1)-th layer are different.

The component of the common material is not limited, and a component that is the same as a component constituting the main component of the dielectric layer can be used, for example.

Next, the inner green sheet 10$a$ is formed on a carrier sheet (for example, a PET film) as a support by a doctor blade method. The inner green sheet 10$a$ is dried after being formed on the carrier sheet.

Figure 4:
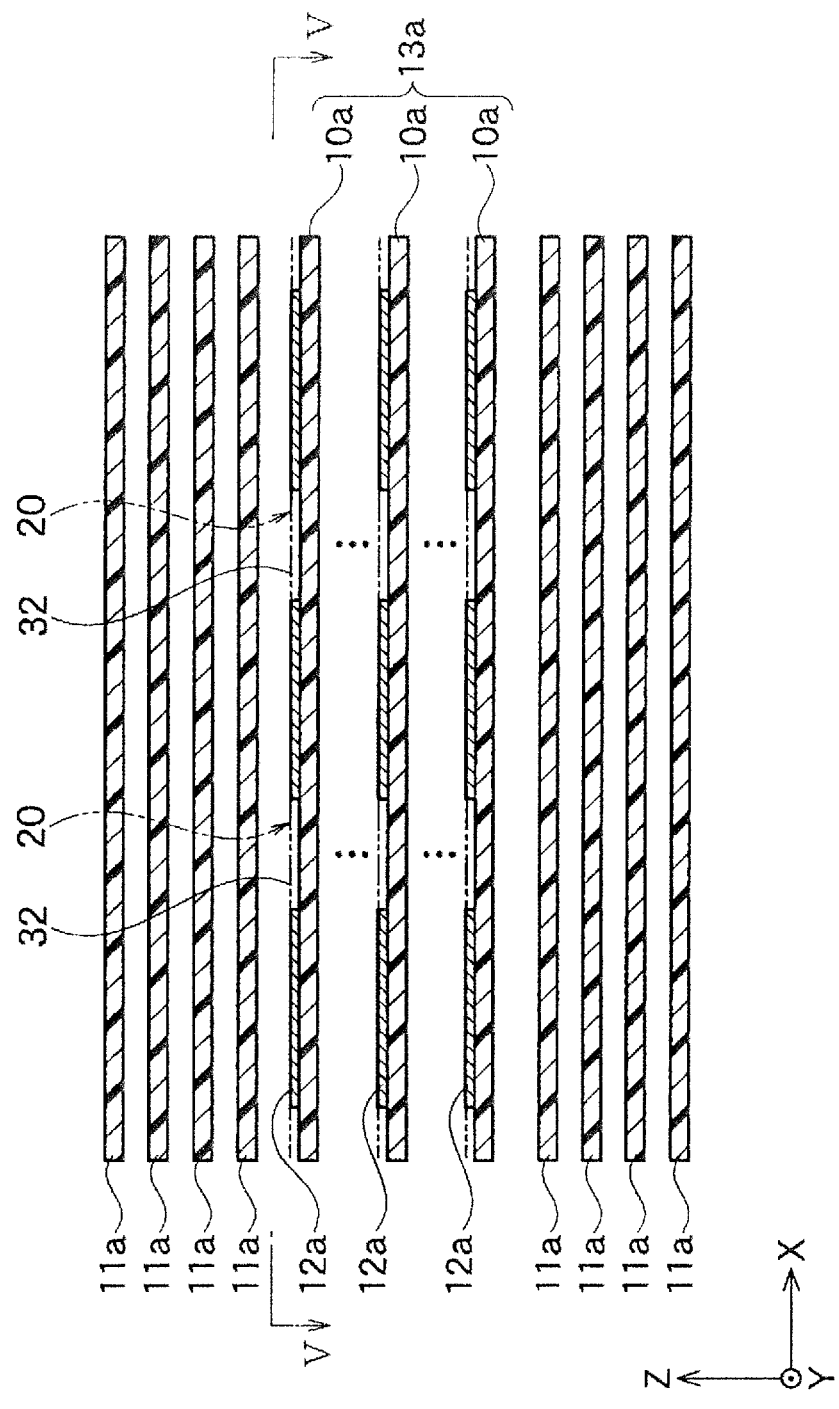
FIG. 4 is a schematic cross-sectional view illustrating the step of laminating a green sheet in the manufacturing process of a multilayer ceramic capacitor illustrated in FIG. 1.

Next, as illustrated in FIG. 4, the internal electrode pattern layer 12$a$ for n-th layer is formed on the surface of the inner green sheet 10$a$ by using the paste for internal electrode layer for n-th layer.

An internal laminate 13$a$ illustrated in FIG. 4 is accordingly manufactured by alternately laminating an inner green sheet 10$a$ where the internal electrode pattern layer for n-th layer is formed and an inner green sheet 10$a$ where the internal electrode pattern layer for (n+1)-th layer is formed.

After the internal laminate 13$a$ is manufactured, the outer green sheet 11$a$ is formed thereon by using the paste for outer green sheet, and the resultant is pressurized in the laminating direction to obtain a green laminate.

After calcinating the green laminate, an element body 3 is accordingly obtained. In the element body 3, a content of the common material contained in the internal electrode layer 12 for n-th layer and a content of the common material contained in the internal electrode layer 12 for (n+1)-th layer are different. That is, in the element body 3, the two kinds of internal electrode layers 12 having different contents of the common materials are alternately laminated by sandwiching the inner dielectric layer 10. Incidentally, the contents of the common materials may be the same when controlling the variance of the retraction distances by a method other than the contents of the common materials.

As a method for manufacturing the green laminate, in addition to the above, a green laminate may be obtained by alternately laminating a predetermined number of the inner green sheet 10$a$ and the internal electrode pattern layer 12$a$ directly on the outer green sheet 11$a$ and pressurizing the resultant in the laminating direction.

Figure 5A:
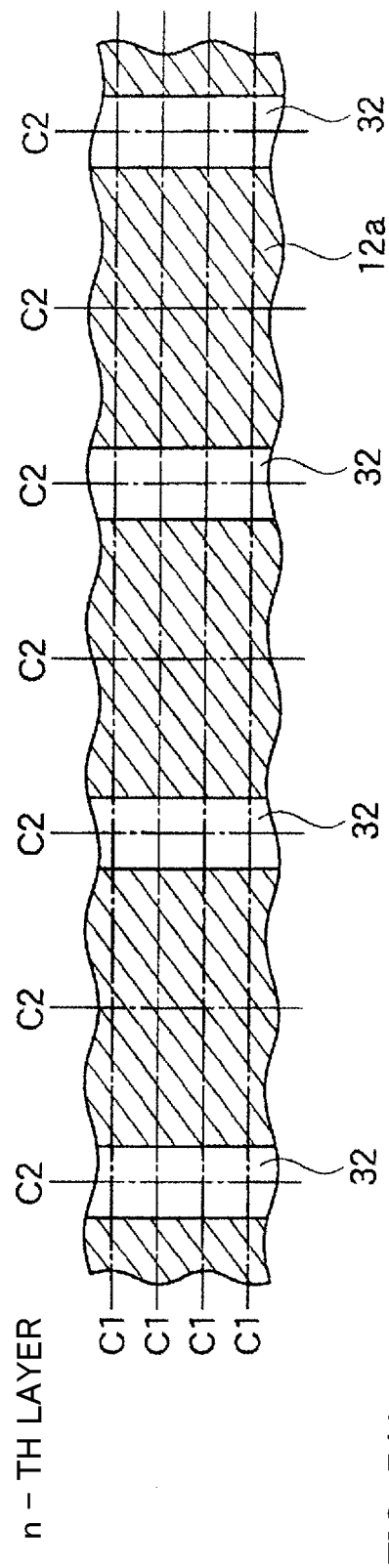
FIG. 5Aa is a plan view illustrating a portion of the n-th internal electrode pattern layer taken along the line V-V illustrated in FIG. 4.
Figure 5A:
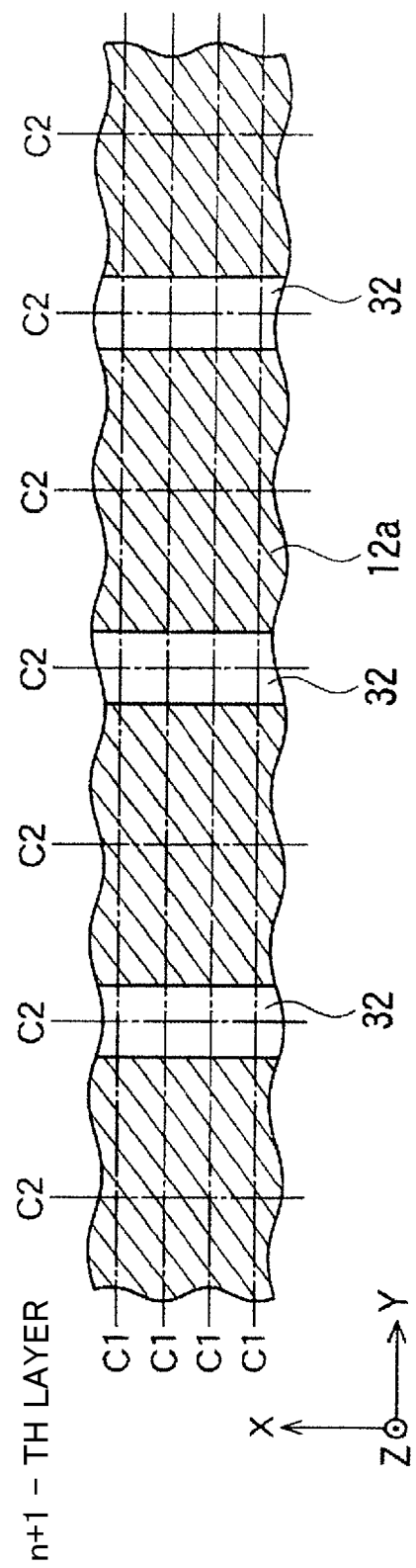

When manufacturing the internal laminate 13$a$, as illustrated in FIG. 5Aa, a gap 32 of the internal electrode pattern layer 12$a$ is formed in the Y-axis direction and a continuous flat internal electrode pattern layer 12$a$ is formed in the X-axis direction at the n-th layer.

Next, as illustrated in FIG. 5Ab, the gap 32 of the internal electrode pattern layer 12$a$ is formed in the Y-axis direction and a continuous flat internal electrode pattern layer 12$a$ is formed in the X-axis direction at the (n+1)-th layer as well. At this time, the gaps 32 of the n-th layer and the (n+1)-th layer of the internal electrode pattern layer 12$a$ are formed so as not to overlap each other in the Z axis direction of the laminating direction.

In this manner, the internal laminate 13$a$ is manufactured by laminating a plurality of the inner green sheet 10$a$ having the internal electrode pattern layer 12$a$, and a green laminate is obtained by the above-mentioned method.

Figure 6A:
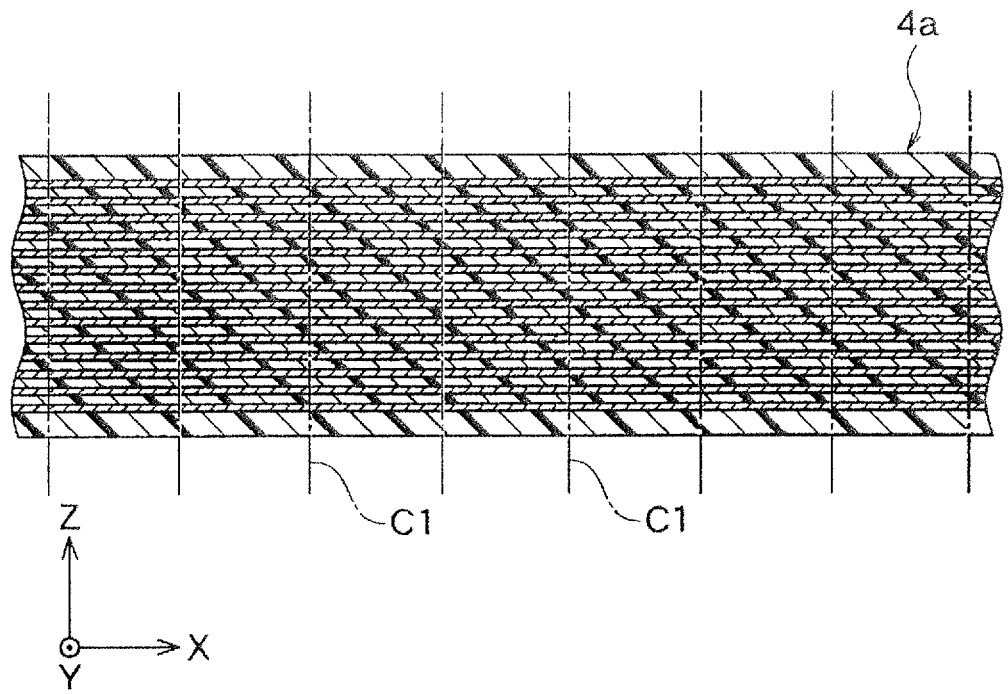
FIG. 6A is a schematic cross-sectional view of the laminate after lamination of the green sheet illustrated in FIG. 4 parallel to the X-Z-axis plane.
Figure 6B:
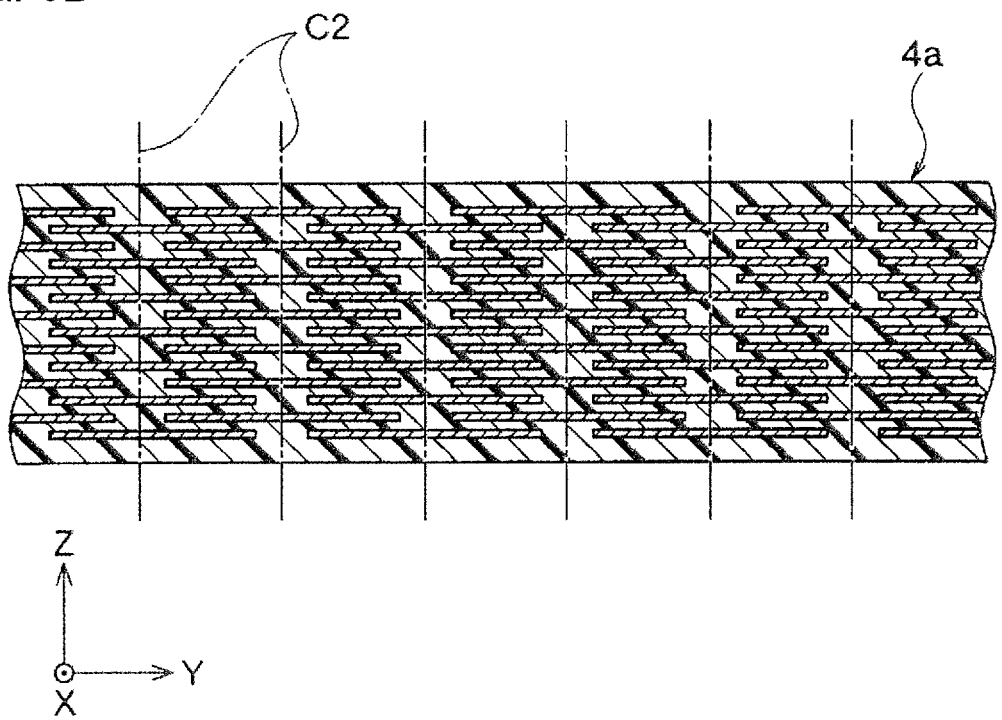
FIG. 6B is a schematic cross-sectional view of the laminate after the lamination of the green sheet illustrated in FIG. 4 parallel to the Y-Z-axis plane.

Next, the green laminate is cut along a cutting plane C1 and a cutting plane C2 in FIG. 5Aa, FIG. 5Ab, FIG. 6A, and FIG. 6B to obtain a green chip. C1 is a cutting plane parallel to the Y-Z axis plane, and C2 is a cutting plane parallel to the Z-X-axis plane.

As illustrated in FIG. 5Aa, the cutting plane C2 on the both sides of the cutting plane C2 to cut the internal electrode pattern layer 12$a$ at the n-th layer cuts the gap 32 of the internal electrode pattern layer 12$a$. In addition, the cutting plane C2 which has cut the internal electrode pattern layer 12$a$ at the n-th layer cuts the gap 32 of the internal electrode pattern layer 12$a$ at the (n+1)-th layer.

By obtaining the green chip by such a cutting method, the n-th internal electrode pattern layer 12$a$ of the green chip is configured to be exposed on one cutting plane and not to be exposed on the other cutting plane in the cutting plane C2 of the green chip. In addition, the (n+1)-th internal electrode pattern layer 12$a$ of the green chip has a configuration in which the internal electrode pattern layer 12$a$ is not exposed on the other cutting plane on which the internal electrode pattern layer 12$a$ is exposed at the n-th layer and the internal electrode pattern layer 12$a$ is exposed on one cutting plane on which the internal electrode pattern layer 12$a$ is not exposed at the n-th layer on the cutting plane C2 of the green chip.

Furthermore, the internal electrode pattern layer 12$a$ is configured to be exposed in all of the layers on the cutting plane C1 of the green chip.

Incidentally, the method for forming the internal electrode pattern layer 12$a$ is not particularly limited, and it may be formed by a thin film forming method such as vapor deposition or sputtering other than a printing method and a transcription method.

In addition, a step absorbing layer 20 may be formed at the gap 32 of the internal electrode pattern layer 12a. The step on the surface of the green sheet 10a due to the internal electrode pattern layer 12a is eliminated by forming the step absorbing layer 20, and the step absorbing layer 20 finally contributes to the prevention of deformation of the ceramic sintered body 4 to be obtained.

The step absorbing layer 20 is formed by a printing method or the like in the same manner as the internal electrode pattern layer 12a, for example. The step absorbing layer 20 contains a ceramic powder and an organic vehicle which are the same as those in the green sheet 10a, but it is formed by a printing method unlike the green sheet 10a, and thus the ceramic powder and the organic vehicle are adjusted so as to be easily printed. Examples of the printing method may include screen printing and gravure printing.

The green chip is solidified by removing the plasticizer through solidification and drying. The green chip after the solidification and drying is introduced into the barrel container together with the media and the polishing liquid and subjected to barrel polishing by a horizontal centrifugal barrel machine or the like. The green chip after the barrel polishing is washed with water and dried. The green chip after drying is subjected to a binder removal step, a calcination step, and an annealing step to be conducted if necessary, whereby the element body 3 is obtained.

Known conditions may be set for the binder removal step, and for example, the retention temperature may be set to from 200° C. to 400° C.

In the present embodiment, the calcination step and the annealing step are conducted in a reducing atmosphere. Other calcination conditions or other annealing conditions may be known conditions, and for example, the retention temperature for calcination is from 1000° C. to 1300° C., and the retention temperature for annealing is from 500° C. to 1000° C.

The binder removal step, the calcination step, and the annealing step may be conducted continuously or independently.

After the annealing, an insulation treatment is performed to the end portions in the X-axis direction of internal electrode layers. The insulation treatment includes wet etching, oxidation treatment, ion milling, nitriding, alloying, or the like.

For example, a wet etching with $FeCl_3$ is performed to the end surface in the X-axis direction of the element body 3 and an oxidation treatment for calcination in the air atmosphere is performed, thereby the end portions in the X-axis direction of the internal electrode layers 12 containing Ni are retracted and the end portions in the X-axis direction of the internal electrode layers 12 can be insulated.

As described above, in the element body 3 according to the present embodiment, a content of the common material contained in the internal electrode layer 12 for n-th layer and a content of the common material contained in the internal electrode layer 12 for (n+1)-th layer are different. Thus, the retraction distances of the internal electrode layers 12 are varied in every layer of the internal electrode layers 12 by performing the wet etching with $FeCl_3$, because the internal electrode layers 12 having many common materials tend to be hard to be shaved, and the internal electrode layers 12 having less common materials tend to be easy to be shaved.

The conditions for the wet etching and the oxidation treatment are not particularly limited, but they are preferably performed under the following conditions.

<Wet Etching>

$FeCl_3$ etching solution: 10 to 30 parts by weight of $FeCl_3$ are added to 100 parts by weight of etching solution.

Etching time: 5 to 720 sec

<Oxidation Treatment>

Rising temperature (falling temperature) rate: 10° C. to 5000° C./hour

Retention temperature: 500° C. to 1000° C.

Atmosphere: in the air

Next, the paste for insulating layer is applied to the both end surfaces in the X-axis direction of the element body 3 mentioned above and baked to form the insulating layers 16 and obtain the ceramic sintered body 4 illustrated in FIG. 1 and FIG. 2. This insulation layer 16 not only improves insulating properties but also enhances moisture resistance.

In the case of coating the paste for insulating layer, the paste may be coated not only on the both end portions in the X-axis direction of the element body 3 but also on the both end portions in the X-axis direction of the both end surfaces in the Z-axis direction and/or on the both end portions in the X-axis direction of the both end surfaces in the Y-axis direction of the element body 3.

When the insulating layer 16 is constituted by glass, this paste for insulating layer is obtained by kneading glass raw material, a binder whose main component is ethyl cellulose, and terpineol and acetone of the dispersion medium by a mixer, for example.

When the insulating layer 16 is constituted by resin, without using the paste for insulating layer, a resin is applied to both end surfaces in the X-axis direction of the element body 3 and both end portions in the X-axis direction of both end surfaces in the Z-axis direction and/or both end portions in the X-axis direction of both end surfaces in the Y-axis direction of the element body 3.

The element body 3 is coated with the paste for insulating layer by any method, such as dipping, printing, coating, vaporizing, sputtering, or the like.

The ceramic sintered body 4 is obtained by coating the paste for insulating layer on the element body 3, drying, subjecting to the binder removal treatment, and baking the paste.

The glass component that is liquefied at the time of baking easily penetrates into the gap from the end portion of the inner dielectric layer 10 to the end portion of the internal electrode layer 12 by the capillary action. Accordingly, the gap is reliably filled with the insulating layer 16, and thus not only the insulating properties are enhanced but also the moisture resistance is favorable.

Incidentally, when the insulating layer 16 is resin, this resin is applied to a predetermined part of the element body 3 and then dried solely.

The both end surfaces in the Y-axis direction and/or the both end surfaces in the Z-axis direction of the ceramic sintered body 4 obtained as described above are polished, for example, by barrel polishing, sandblasting, or the like if necessary.

Next, a paste for external electrode is applied to both end surfaces in the Y-axis direction of the ceramic sintered body where the insulating layer 16 is baked and is baked so as to form the external electrodes 6 and 8. The paste for external electrode may be prepared in the same manner as the paste for internal electrode layer described above.

Incidentally, when the oxidation treatment is performed against the end portion of the internal electrode layer 12, the end portion of the internal electrode layer 12 exposed to both end surfaces in the Y-axis direction of the ceramic sintered body 4 with the external electrodes 6 and 8 to be formed may be also oxidized. When the oxidation treatment is performed, reducing treatment is thus preferably performed against both end surfaces in the Y-axis direction of the ceramic sintered body 4 before the application of the paste for external electrode or at the time of baking the paste for external electrode.

The formation of the external electrodes 6 and 8 may be conducted before the formation of the insulating layer 16 or after the formation of the insulating layer 16 or may be simultaneously conducted with the formation of the insulating layer 16, and preferably it is conducted after the formation of the insulating layer 16.

The method for forming the external electrodes 6 and 8 is not particularly limited either, and it is possible to use an appropriate method such as coating and baking of the paste for external electrode, plating, vapor deposition, or sputtering.

If necessary, a covering layer is formed on the surface of the external electrodes 6 and 8 by plating or so.

The multilayer ceramic capacitor 2 of the present embodiment thus manufactured is mounted on a printed circuit board by soldering or the like and used in various kinds of electronic devices.

In the prior art, a portion of the dielectric layer is adopted as a gap portion, and thus a blank pattern in which the internal electrode pattern layer is not formed is formed at the portion to be the gap portion after calcination of the surface of the green sheet at a predetermined interval along the X-axis direction.

In contrast, in the present embodiment, the internal electrode pattern layer is continuously formed along the X-axis direction, and the gap portion is obtained by forming an insulating layer on the element body. Hence, a blank pattern for forming the gap portion is not formed. Accordingly, a flat film of the internal electrode pattern layer is formed on the green sheet unlike the method of the prior art. Hence, the number of acquisition of the green chip per area of the green sheet can be increased as compared to the prior art.

In addition, in the present embodiment, the green laminate is cut without having to worry about the blank pattern unlike the prior art, and thus the yield of cutting is improved as compared to that in the prior art.

Furthermore, there is a problem in the prior art that the thickness of the blank pattern portion is thinner as compared to the portion at which the internal electrode pattern layer is formed when the green sheet is laminated and thus the green chip is curved in the vicinity of the cutting plane thereof when the green laminate is cut. In addition, in the prior art, a bump is formed near the blank pattern portion of the internal electrode pattern layer, and thus irregularities is caused on the internal electrode layer and it is concerned that the internal electrode or green sheet is deformed as these are laminated. In contrast, in the present embodiment, the blank pattern is not formed and the bump of the internal electrode pattern layer is also not formed.

Furthermore, in the present embodiment, the internal electrode pattern layer is a flat film, a bump of the internal electrode pattern layer is not formed, and bleeding or blurring of the internal electrode pattern layer is not caused in the vicinity of the gap portion, and thus it is possible to improve the acquisition capacity. This effect is more remarkable as the element body is smaller.

The embodiments of the present invention have been described, but the present invention is not limited to the embodiments described above in any way and may be variously modified within the scope of the present invention.

For example, the wet etching using predetermined internal electrode pattern layers is shown above as a method for varying retraction distances of the end portions in the X-axis direction of the internal electrode layers 12 in every layer of the internal electrode layers 12 or changing a variance degree, but is not restrictive.

In addition to the above method, forming the nonconductive portions 18 at the end portions in the X-axis direction of the internal electrode layers 12 can also vary retraction distances of the end portions in the X-axis direction of the internal electrode layers 12 in every layer of the internal electrode layers 12 or change a variance degree.

Specifically, the nonconductive portion 18 can be formed by oxidizing, nitriding, or alloying the end portion in the X-axis direction of the internal electrode layer 12.

In this case, the element body 3 used may be one where the two kinds of internal electrode layers 12 having different contents of the common materials are alternately laminated by sandwiching the inner dielectric layer 10, or may be one where the internal electrode layers 12 having the same contents of common materials are alternately laminated by the inner dielectric layer 10. The internal electrode layers 12 may not contain a common material.

A method for oxidizing the end portions in the X-axis direction of the internal electrode layers 12 is not particularly limited, and this oxidation may be performed under the above conditions of oxidation treatment, may be performed by applying a gas laser to the end portions in the X-axis direction of the element body 3 so as to heat them to high temperature, or may be performed by applying nickel oxide to the end portions in the X-axis direction of the internal electrode layers 12 by sputtering or so.

Figure 5B:
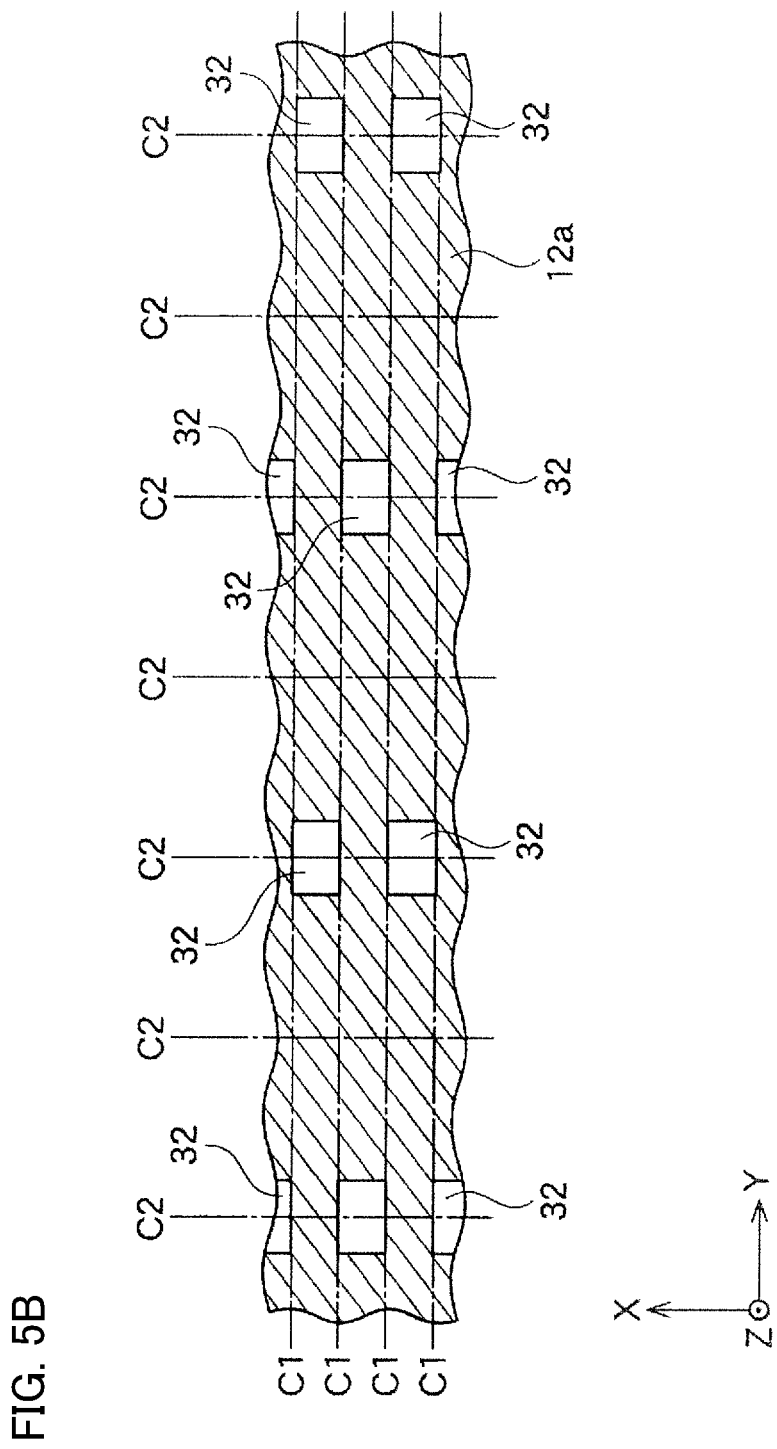
FIG. 5B is a plan view illustrating a portion of the internal electrode pattern layer taken along the line V-V illustrated in FIG. 4.

The internal electrode pattern layer 12a may be a pattern having the gap 32 of the grid-like internal electrode pattern layer 12a as illustrated in FIG. 5B in addition to the pattern illustrated in FIG. 5Aa and FIG. 5Ab.

In addition, the multilayer electronic component of the present invention is not limited to a multilayer ceramic capacitor, but it can be applied to other multilayer electronic components. Other multilayer electronic components are all of the electronic parts in which the dielectric layer is laminated via an internal electrode, and examples thereof may include a bandpass filter, a chip inductor, a laminated three-terminal filter, a piezoelectric element, a chip thermistor, a chip varistor, a chip resistor, and other surface mounted (SMD) chip type electronic parts.

EXAMPLES

Hereinafter, the present invention will be described based on further detailed Examples, but the present invention is not limited to these Examples.

Example 1

The capacitor samples of sample No. 1 to sample No. 10 were fabricated as follows so as to measure a CV value showing a variance degree of retraction distances of internal electrode layers and evaluate an insulation resistance defective rate.

First, a $BaTiO_3$-based ceramic powder: 100 parts by weight, a polyvinyl butyral resin: 10 parts by weight, dioctyl phthalate (DOP) as a plasticizer: 5 parts by weight, an alcohol as a solvent: 100 parts by weight were mixed and pasted by a ball mill, thereby obtaining a paste for inner green sheet.

In addition, apart from to the above, Ni particles: 44.6 parts by weight, terpineol: 52 parts by weight, ethyl cellulose: 3 parts by weight, and benzotriazole: 0.4 parts by weight were kneaded and formed into to a slurry by a triple roll, thereby preparing a paste for internal electrode layer.

Furthermore, 15.0 parts by weight of $BaTiO_3$ as common material was added to 100 parts by weight of the paste for internal electrode layer so as to prepare a paste for internal electrode for n-th layer kneaded by a triple roll.

Furthermore, 30.0 parts by weight of $BaTiO_3$ as common material was added to 100 parts by weight of the paste for internal electrode layer so as to prepare a paste for internal electrode for (n+1)-th layer kneaded by a triple roll.

The two kinds of paste for internal electrode layer of the paste for internal electrode layer for n-th layer and the paste for internal electrode layer for (n+1)-th layer were fabricated.

The inner green sheet 10a was formed on a PET film by using the paste for inner green sheet prepared in the above so as to have a thickness of 7 μm after drying. Subsequently, the internal electrode pattern layer 12a in n-th layer was formed thereon in a predetermined pattern by using the paste for internal electrode layer for n-th layer, and the sheet was peeled off from the PET film. Then, the inner green sheet 10a having the internal electrode pattern layer 12a in n-th layer was obtained.

The inner green sheet was formed on a PET film by using the paste for inner green sheet prepared in the above so as to have a thickness of 7 μm after drying. Subsequently, the internal electrode pattern layer 12a in (n+1)-th layer was formed thereon in a predetermined pattern by using the paste for internal electrode layer for (n+1)-th layer, and the sheet was peeled off from the PET film. Then, the inner green sheet 10a having the internal electrode pattern layer 12a in (n+1)-th layer was obtained.

The internal laminate 13a shown in FIG. 4 was accordingly fabricated by alternately the two kinds of inner green sheets having the internal electrode pattern layers 12a having different contents of common material.

Next, an appropriate number of the outer green sheets 11a was then formed above and below the internal laminate 13a by using the paste for outer green sheet, and the resultant was pressurized and bonded in the laminating direction, thereby obtaining a green laminate. The paste for outer green sheet was obtained by the same method as the paste for inner green sheet.

Next, the green laminate was cut along the cutting plane C1 and the cutting plane C2 to obtain a green chip as illustrated in FIG. 5Aa, FIG. 5Ab, FIG. 6A, and FIG. 6B.

Next, the green chip thus obtained was subjected to the binder removal treatment, the calcination, and the annealing under the following conditions, thereby obtaining the element body 3.

The condition for binder removal treatment was set so as to have a rate of temperature rise: 60° C./hour, a retention temperature: 260° C., a retention time: 8 hours, and an atmosphere: in the air.

The condition for calcination was set so as to have a rate of temperature rise: 200° C./hour, a retention temperature: from 1000° C. to 1200° C., and a temperature retention time: 2 hours. A cooling speed was 200° C./hour. Incidentally, the atmosphere gas was a humidified $N_2+H_2$ mixed gas.

The condition for annealing was set so as to have a rate of temperature rise: 200° C./hour, a retention temperature: from 500° C. to 1000° C., a temperature retention time: 2 hours, a cooling speed: 200° C./hour, and an atmosphere gas: humidified $N_2$ gas.

Incidentally, a wetter was used for the humidification of the atmosphere gas at the time of calcination and annealing.

After the annealing, an insulation treatment was performed to the end portions in the X-axis of the internal electrode layers. A wet etching was performed by an etching solution whose $FeCl_3$ concentration was 15 wt % so as to inwardly retract the end portions in the X-axis of the internal electrode layers and perform insulation. The etching time was shown in Table 1.

Next, a paste for insulating layer was prepared by kneading glass powder, a binder whose main component was ethyl cellulose, and terpineol and acetone of the dispersion medium by a mixer.

The chip obtained by coating the paste for insulating layer on the entire surface of the end surface in the X-axis direction, the end portion in the X-axis direction on the end surface in the Y-axis direction, and the end portion in the X-axis direction on the end surface in the Z-axis direction of the element body 3 through dipping and drying the paste was subjected to the binder removal treatment and baking using a belt conveyor furnace to form the insulating layer 16 on the element body 3, thereby obtaining the ceramic sintered body 4. The conditions for drying of the paste for insulating layer, binder removal treatment, and baking were as follows.

Drying
Temperature: 180° C.
Binder removal treatment
Rate of temperature rise: 1000° C./hour
Retention temperature: 500° C.
Temperature retention time: 0.25 hour
Atmosphere: in the air
Baking
Rate of temperature rise: 700° C./hour
Retention temperature: 700° C. to 1000° C.
Temperature retention time: 0.5 hour
Atmosphere: humidified $N_2$ gas The end surface in the Y-axis direction of the ceramic sintered body 4 thus obtained was polished by barrel treatment.

Next, 100 parts by weight of a mixture of spherical Cu particles having an average particle size of 0.4 μm and a flaky Cu powder, 30 parts by weight of an organic vehicle (one prepared by dissolving 5 parts by weight of an ethyl cellulose resin in 95 parts by weight of butyl carbitol), and 6 parts by weight of butyl carbitol were kneaded to obtain a pasted paste for external electrode.

The obtained paste for external electrode was transcripted on the end surface in the Y-axis direction of the ceramic sintered body 4, calcinated for 10 minutes at 850° C. in $N_2$ atmosphere to form the external electrodes. Then, the multilayer ceramic capacitor 2 was obtained.

The capacitor sample (multilayer ceramic capacitor 2) manufactured in this way had a size of 3.2 mm×2.5 mm×1.5 mm, and the inner dielectric layer 10 was 10-layered. Incidentally, the inner dielectric layer 10 had a thickness of 5.0 μm, the internal electrode layer 12 had a thickness of about 1.2 μm, and a width Wgap of the gap portion composed of the insulating layer 16 was about 20.0 μm.

The capacitor sample and the like thus obtained was measured or evaluated by the following methods.
<CV Value>

The resin embedding was conducted so that the capacitor sample stood facing down the main surface in the Z-axis direction, and the other main surface was polished along the Z-axis direction of the multilayer ceramic capacitor 2, thereby obtaining a polished cross section having the length of the Z-axis direction of the element body 3 of ½H0. Next, this polished cross section was subjected to ion milling to remove the undercut caused by polishing. A cross section for observation was obtained in this manner.

Next, retraction distances at the end portions in the X-axis direction of the internal electrode layers 12 illustrated in FIG. 3 were measured at 20 points per cross section of one sample. This operation was carried out against 10 capacitor samples. The average value $d_a$ of the retraction distances 18 at the 200 points measured was obtained, and a CV value was obtained by the above formula (1). Incidentally, portions where the internal electrode layer 12 was defected were not counted.

For measuring the retraction distances, a digital microscope (VHX microscope by KEYENCE CORPORATION) was used, and observation and measurement were performed by a 5000 magnification lens. Incidentally, a boundary between the insulating layer 16 and the internal electrode layer 12 containing Ni can be determined by performing the observation with the digital scope by optical mode, because a clear difference appeared between the insulating layer 16 having low lightness and Ni having high lightness. The results are shown in Table 1.

<Insulation Resistance Defective Rate>

With respect to 100 capacitor samples, insulation resistance was measured at room temperature by a digital resistance meter (R8340 by ADVANTEST) under conditions of measured voltage of 4V and measurement time of 30 seconds. Values of an average resistivity were calculated based on an electrode area of the capacitor sample and the thickness of the inner dielectric layer 10. The results are shown in Table 1. A higher resistivity is preferable. It was considered to be favorable when 25% or less of all measured samples had a resistivity value of less than $1.0 \times 10^9$ Ωcm, and it was considered to be more favorable when 15% or less of all measured samples had a resistivity value of less than $1.0 \times 10^9$ Ωcm. In Table 1, samples are represented by ○, Δ, or x in order from a sample having the most favorable insulation resistance defective rate.

TABLE 1

| Example 1 Sample number | Etching time (sec) | CV value | Insulation resistance defective rate |
|---|---|---|---|
| 1 | 5 | 0.023 | Δ: 25% |
| 2 | 10 | 0.051 | ○: 11% |
| 3 | 15 | 0.074 | ○: 9% |
| 4 | 30 | 0.158 | ○: 7% |
| 5 | 60 | 0.232 | ○: 8% |
| 6 | 120 | 0.382 | ○: 11% |
| 7 | 240 | 0.772 | ○: 12% |
| 8 | 300 | 0.987 | ○: 10% |
| 9 | 360 | 1.198 | X: 52% |
| 10 | 720 | 2.241 | X: 100% |

It was confirmed from sample No. 1 to sample No. 10 that the insulation resistance defective rate was favorable when the CV value was 1.0 or less, compared with when the CV value was 1.198 (sample No. 9) and when the CV value was 2.241 (sample No. 10). Furthermore, it was confirmed that the insulation resistance defective rate was more favorable when the CV value was 0.05 to 1.0, compared with when the CV value was 0.023 (sample No. 1).

As for sample No. 1, since the CV value is relatively low and the retraction distances are namely not varied, the electric field tends to concentrate on the end portions in the X-axis direction of the internal electrode layers at the time of thinning the inner dielectric layer. That is why it is considered that the insulation resistance defective rate of sample No. 1 was higher compared with those of sample No. 2 to No. 8.

As for sample No. 9 and sample No. 10, the CV values are too high and the retraction distances are namely varied too much, it is thus considered that structural defects are easy to occur, and the insulation resistance defective rates are consequently higher than those of sample No. 1 to No. 8.

Example 2

Except for changing the $FeCl_3$ concentration of the etching solution and the etching time as described in Table 2, the capacitor samples of sample No. 11 to sample No. 24 were fabricated in the same manner as Example 1. Then, Q value was measured, and insulation resistance defective rate, electrostatic capacity ratio (C/C40), and insulation breakdown voltage defective rate were evaluated. The results are shown in Table 2. As for sample No. 13, the CV value was further measured. The result is shown in Table 3.

Incidentally, the insulation resistance defective rates of sample No. 11 to sample No. 24 and the CV value of sample No. 13 were measured in the same manner as Example 1. The method for measuring the Q values and the method for evaluating the electrostatic capacity ratios and the insulation breakdown voltage defective rates are as below.

<Q Value>

The capacitor sample were prepared, and a cross section for observation was obtained.

Next, retraction distances at the end portions in the X-axis direction of the internal electrode layers 12 illustrated in FIG. 3C were measured at 20 points per cross section of one sample, and a thickness $td_k$ of the inner dielectric layer 10 between the measured internal electrode layers 12 was measured. This operation was carried out against 10 capacitor samples. An average of $|d_{k+1} - d_k|$ was obtained based on the retraction distances of the measured 200 points, and an average $td_a$ of the thicknesses $td_k$ of the inner dielectric layers 10 was obtained. Then, a Q value was obtained by the above formula (2). Incidentally, portions where the internal electrode layer 12 was defected were not counted.

For measuring the retraction distances and the thicknesses of the inner dielectric layers 10, a digital microscope (VHX microscope by KEYENCE CORPORATION) was used, and observation and measurement were performed in the same manner as the above CV value.

<Ratio of Electrostatic Capacity (C/C40)>

The ratio of electrostatic capacity of 100 capacitor samples was measured at temperature of 25° C. by a digital LVR meter under conditions of 1 kHz and 5.0 Vrms, and the average value thereof (C) was obtained. Electrostatic capacity of 100 conventional products whose chip size was the same as the present example and the width Wgap (side gap) of the gap portion was 40 μm was measured under the same conditions, its average value (C40) was obtained, and the ratio of electrostatic capacity (C/C40) was obtained. The results are shown in Table 2. It was considered that an electrostatic capacity ratio (C/C40) of 1.2 or more was particularly favorable, an electrostatic capacity ratio (C/C40) of 1.0 to 1.1 or more was favorable, and an electrostatic capacity ratio (C/C40) of less than 1.2 was defective. Incidentally, in Table 2, samples are represented by ○, Δ, or x in order from a sample having the most favorable electrostatic capacity ratio.

<Insulation Breakdown Voltage Defective Rate>

With a measuring machine of breakdown voltage, current was continuously applied to the capacitor sample at 10 V/sec, and a voltage when a current of 10 mA flew was considered as being insulation breakdown voltage. A value obtained by dividing this voltage by the thickness of the inner dielectric layer 10 was considered as being a breakdown voltage value. A capacitor sample broken in an insulating manner at 40 V/μm or less was considered as being defective, and a defective rate of 100 capacitor samples was obtained. The result is shown in Table 2. An insulation breakdown voltage defective rate of 20% or less was considered as being favorable, an insulation breakdown voltage defective rate of 15% or less was considered as being more favorable, and an insulation breakdown voltage defective rate of 3% or less was considered as being extremely favorable. Incidentally, in Table 2, samples are represented by ⊚, ○, Δ, or x in order from a sample having the most favorable insulation breakdown voltage defective rate.

large. This is considered to generate a defective electrostatic capacity compared with the samples whose Q value is 0.004 or more.

When the Q value was more than 0.300 (sample No. 11, No. 12, No. 15, and No. 20), it was suggested that the variance of the retraction distances of the adjacent internal electrode layers was too small. This is considered to generate a defective insulation breakdown voltage defective rate compared with the samples whose Q value is 0.300 or less.

Example 3

The capacitor samples of sample No. 25 to sample No. 29 were fabricated in the same manner as Example 1, except that the composition and the softening point of the glass contained in the insulating layer 16 were ones shown in Table 4, the retention temperature at the time of baking the paste for insulating layer was 700° C., and the thickness of the inner dielectric layer was 1.6 μm. Then, Q value was

TABLE 2

| Example 2 Sample number | Etching solution concentration (%) | Etching time (sec) | Average $|d_{k+1} - d_k|$ (μm) | $td_a$ (μm) | Q value | Insulation resistance defective rate | Electrostatic capacity ratio C/C40 | Insulation breakdown voltage defective rate |
|---|---|---|---|---|---|---|---|---|
| 11 | 15 | 15  | 0.73  | 1.6 | 0.828 | Δ: 18% | ○: 2.4 | X: 29% |
| 12 | 15 | 30  | 1.61  | 1.6 | 0.497 | ○: 12% | ○: 2.1 | Δ: 17% |
| 13 | 15 | 120 | 3.93  | 1.6 | 0.142 | ○: 9%  | ○: 1.9 | ○: 9%  |
| 14 | 15 | 240 | 7.62  | 1.6 | 0.042 | ○: 6%  | ○: 1.8 | ○: 7%  |
| 15 | 12 | 15  | 0.62  | 0.8 | 0.625 | ○: 7%  | ○: 2.0 | X: 24% |
| 16 | 12 | 30  | 1.46  | 0.8 | 0.231 | ○: 15% | ○: 1.8 | ○: 12% |
| 17 | 12 | 120 | 3.84  | 0.8 | 0.042 | ○: 10% | ○: 1.5 | ○: 10% |
| 18 | 12 | 240 | 6.99  | 0.8 | 0.013 | ○: 9%  | Δ: 1.1 | ○: 8%  |
| 19 | 12 | 360 | 13.54 | 0.8 | 0.003 | ○: 7%  | X: 0.8 | ○: 6%  |
| 20 | 10 | 15  | 0.75  | 0.5 | 0.308 | ○: 7%  | ○: 1.5 | X: 32% |
| 21 | 10 | 30  | 1.71  | 0.5 | 0.079 | Δ: 18% | ○: 1.4 | ○: 14% |
| 22 | 10 | 120 | 4.01  | 0.5 | 0.015 | ○: 12% | ○: 1.2 | ○: 12% |
| 23 | 10 | 240 | 8.09  | 0.5 | 0.004 | ○: 10% | Δ: 1.1 | ○: 10% |
| 24 | 10 | 360 | 17.69 | 0.5 | 0.001 | ○: 6%  | X: 0.6 | ○: 5%  | measured, and insulation resistance defective rate, electro-

TABLE 3

| Example 2 Sample number | Etching solution concentration (%) | Etching time (sec) | Average $|d_{k+1} - d_k|$ (μm) | $td_a$ (μm) | Q value | Insulation resistance defective rate | Electrostatic capacity ratio C/C40 | Insulation breakdown voltage defective rate | CV value |
|---|---|---|---|---|---|---|---|---|---|
| 13 | 15 | 120 | 3.93 | 1.6 | 0.142 | ○: 9% | ○: 1.9 | ○: 9% | 0.355 |

It was confirmed from sample No. 11 to sample No. 24 that the electrostatic capacity ratio (C/C40) was favorable when the Q value was 0.004 to 0.300 (sample No. 13, No. 14, No. 16, No. 17, No. 18, No. 21, No. 22, and No. 23), compared with when the Q value was less than 0.004 (sample No. 19 and No. 24).

Also, it was confirmed from sample No. 11 to sample No. 24 that the insulation breakdown voltage defective rate was favorable when the Q value was 0.004 to 0.300 (sample No. 13, No. 14, No. 16, No. 17, No. 18, No. 21, No. 22, and No. 23), compared with when the Q value was more than 0.300 (sample No. 11, No. 12, No. 15, and No. 20) sample No. 11, No. 12, No. 15, and No. 20).

When the Q value was less than 0.004 (sample No. 19 and No. 24), it was suggested that the variance of the retraction distances of the adjacent internal electrode layers was too static capacity ratio (C/C40), insulation breakdown voltage defective rate, and flexural strength were evaluated. The results are shown in Table 5.

The total of the composition of BaO, SiO$_2$, Na$_2$O, and Bi$_2$O$_3$ in the glass powder of sample No. 25 to sample No. 29 in Table 4 is not 100 mass %. This is because the glass powder contained minute components other than BaO, SiO$_2$, Na$_2$O, and Bi$_2$O$_3$.

With respect to sample No. 25 to sample No. 29, the measurement of Q value and the evaluation of insulation resistance defective rate, electrostatic capacity ratio (C/C40), and insulation breakdown voltage defective rate were performed in the same manner as Example 2. The method for evaluating the flexural strength was as below.

<Flexural Strength>

Figure 7:
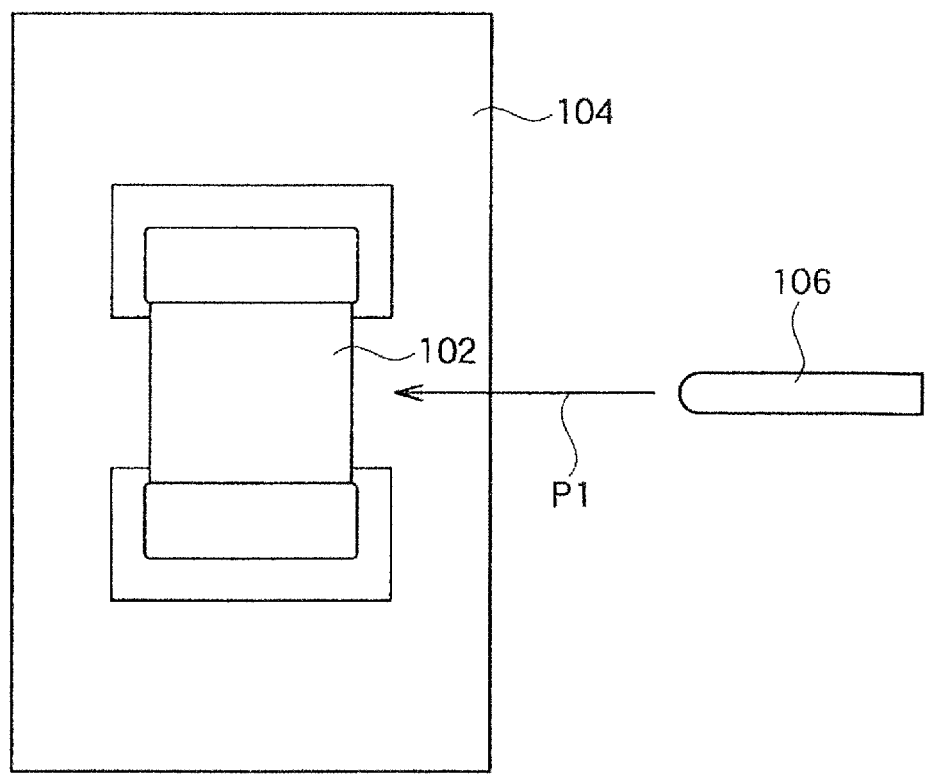
FIG. 7 is a schematic view for explaining a method for measuring flexural strength of the present Example.

A capacitor sample 102 was mounted on a glass epoxy substrate 104 (FIG. 7), and a predetermined load was added for 5 seconds from an arrow P1 direction by a rod 106 so as to obtain a deflection amount of 1.0 mm. Then, a capacitor sample whose electrostatic capacity was varied by ±10% or more compared with its initial capacity was defined as a deflection defective product, and a ratio of deflection defective products of 100 capacitor samples was obtained. In the present example, being less than 15% was considered to be favorable and represented by ◯, and being 15% or more was represented by x. Incidentally, the capacitor sample 102 according to the present example has the same internal structure as that of the multilayer ceramic capacitor 2 shown in FIG. 1 and FIG. 2.

TABLE 4

| Example 3 Sample number | BaO | $SiO_2$ | $Na_2O$ | $Bi_2O_3$ | Softening point (° C.) |
|---|---|---|---|---|---|
| 25 | 50 mass % | — | 20 mass % | — | 491 |
| 26 | 50 mass % | — | 10 mass % | 10 mass % | 439 |
| 27 | — | 50 mass % | 15 mass % | 10 mass % | 537 |
| 28 | 40 mass % | 40 mass % | — | — | 807 |
| 29 | 30 mass % | 50 mass % | — | 5 mass % | 732 |

TABLE 5

| Example 3 Sample number | Average $|d_{k+1} - d_k|$ (μm) | $td_a$ (μm) | CV value | Q value | Insulation resistance defective rate | Electrostatic capacity ratio C/C40 | Insulation breakdown voltage defective rate | Flexural strength |
|---|---|---|---|---|---|---|---|---|
| 25 | 7.62 | 1.6 | 0.351 | 0.042 | ◯: 6% | ◯: 1.4 | ◯: 7% | X |
| 26 | 7.62 | 1.6 | 0.351 | 0.042 | ◯: 6% | ◯: 1.4 | ◯: 7% | X |
| 27 | 7.62 | 1.6 | 0.351 | 0.042 | ◯: 6% | ◯: 1.4 | ◯: 7% | X |
| 28 | 7.62 | 1.6 | 0.351 | 0.042 | ◯: 6% | ◯: 1.4 | ◯: 7% | ◯ |
| 29 | 7.62 | 1.6 | 0.351 | 0.042 | ◯: 6% | ◯: 1.4 | ◯: 7% | ◯ |

It was confirmed from sample No. 25 to sample No. 29 that the flexural strength was favorable when both BaO and $SiO_2$ were contained as glass component (sample No. 28 and sample No. 29), compared with when one of BaO and $SiO_2$ was contained (sample No. 25 to sample No. 27).

When both Si and Ba are contained in the insulating layer (sample No. 28 and sample No. 29), since the insulating layer contains the same composition as that of the dielectric layer, the reaction phase is easy to be formed between the insulating layer and the dielectric layer, and adhesion between the insulating layer and the element body becomes strong. As a result, it is considered that even if the inner dielectric layer was thinned to 1.6 μm, resistance against external stress due to deflection was able to be achieved, and a favorable result to the flexural strength was able to be obtained.

Example 4

Sample No. 30 to sample No. 32 were fabricated in the same manner as Example 1, except for changing the thickness $td_a$ of the inner dielectric layer 10 as described in Table 6. Then, the presence of the nonconductive portion 18 was confirmed, $td_a$ was measured, and insulation resistance defective rate, insulation breakdown voltage defective rate, and short circuit defective rate were evaluated. The result is shown in Table 6. Incidentally, in the cells of "Presence of nonconductive portion", ◯ is displayed when the nonconductive portion was present, and x is displayed when the nonconductive portion was not present.

Sample No. 33 to sample No. 35 were fabricated in the same manner as Example 1, except for conducting an oxidation treatment under the following conditions after changing the thickness $td_a$ of the inner dielectric layer 10 as described in Table 6 and performing wet etching to the element body 3. Then, the presence of the nonconductive portion 18 was confirmed, an average width of the nonconductive portion 18 ($WU_a$) and $td_a$ were measured, and insulation resistance defective rate, insulation breakdown voltage defective rate, and short circuit defective rate were evaluated. The results are shown in Table 6.

Incidentally, with respect to sample No. 30 to sample No. 35, the measurement of $td_k$ and the evaluation of insulation resistance defective rate and insulation breakdown voltage defective rate were performed in the same manner as Example 1 and Example 2. The method for confirming the present of the nonconductive portion 18, the method for measuring the width of the nonconductive portion 18 (WU), and the method for evaluating the short circuit defective rate are as below.

<Oxidation Treatment Conditions>
Rising temperature rate: 250° C./hour
Retention temperature: 600° C.
Temperature retention time: 12 hours
Atmosphere: in the air <Width of Nonconductive Portion (WU)>
The capacitor sample were prepared, and a cross section for observation was obtained.

Next, the widths WU of the nonconductive portions 18 shown in FIG. 3B were measured at 20 points per cross section of one sample. Incidentally, as shown in FIG. 3B, the width WU was determined as a widest width of one nonconductive portion 18. This operation was carried out against 10 capacitor samples. An average value of the widths WU (width $WU_a$) was obtained based on the widths WU at the 200 parts measured. Incidentally, portions where the internal electrode layer 12 was defected were not counted.

For measuring the width WU, a digital microscope (VHX microscope by KEYENCE CORPORATION) was used, and observation and measurement were performed by a 5000 magnification lens. Incidentally, the width WU of the nonconductive portion 18 composed of NiO can be measured by performing the observation with the digital scope by optical mode, because a clear difference appeared between NiO having low lightness and Ni having high lightness. The results are shown in Table 6.

<Short Circuit Defective Rate>
The resistance values of each capacitor sample were measured using an insulation resistance meter (E2377A by Hewlett-Packard Company), and a sample whose resistance value was 100 kΩ or less was determined as a short circuit defective sample. The above measurement was performed to 100 capacitor samples, and a ratio of samples with short circuit defects to all measured samples was determined as a short circuit defective rate. The result is shown in Table 6. In the present example, being 15% or less was considered as being favorable. In Table 6, a short circuit defective rate of 15% or less is represented by ◯, and a short circuit defective rate of more than 15% is represented by x.

TABLE 6

| Example 4 Sample number | Presence of nonconductive portion | Width $WU_a$ of nonconductive potion (μm) | $td_a$ (μm) | CV value | Q value | Insulation resistance defective rate | Insulation breakdown voltage defective rate | Short circuit defective rate |
|---|---|---|---|---|---|---|---|---|
| 30 | X | | 1.6 | 0.351 | 0.142 | ◯: 10% | ◯: 10% | X: 30% |
| 31 | X | | 0.8 | 0.314 | 0.042 | ◯: 9% | ◯: 12% | X: 60% |
| 32 | X | | 0.5 | 0.381 | 0.079 | ◯: 8% | ◯: 14% | X: 90% |
| 33 | ◯ | 5.1 | 1.6 | 0.751 | 0.142 | ◯: 8% | ◯: 8% | ◯: 1% |
| 34 | ◯ | 5.1 | 0.8 | 0.751 | 0.042 | ◯: 7% | ◯: 9% | ◯: 5% |
| 35 | ◯ | 5.1 | 0.5 | 0.751 | 0.079 | ◯: 6% | ◯: 10% | ◯: 10% |

It was confirmed from sample No. 30 to sample No. 35 that the short circuit defective rate was favorable in spite of thinning of the inner dielectric layer when having the nonconductive portion (sample No. 33 to sample No. 35), compared with when having no nonconductive portion (sample No. 30 to sample No. 32).

A major cause of the short circuit is handling at the time of applying an insulator, and the short circuit defective rate tends to be larger when the inner dielectric layer is thinner (sample No. 30 to sample No. 32). It was confirmed that the short circuit defective rate is significantly decreased by having the nonconductive portion (sample No. 33 to sample No. 35).

Example 5

Sample No. 36 to sample No. 38 were fabricated in the same manner as Example 1, except that the end portions of the internal electrode layers were treated under the following conditions after changing the thickness $td_a$ of the inner dielectric layer 10 as described in Table 7 and performing wet etching to the element body 3. Then, an average width $WU_a$ of the nonconductive portions 18 and $td_a$ were measured, and an insulation resistance defective rate and an insulation breakdown voltage defective rate were evaluated. The result is shown in Table 7. Incidentally, with respect to sample No. 36 to sample No. 38, the measurement of $td_a$ and the evaluation of insulation resistance defective rate and insulation breakdown voltage defective rate were performed in the same manner as Example 1 and Example 2.

<Treatment of End Portions of Internal Electrode Layers of Sample No. 36>

Oxidation condition of end portions of the internal electrode layers 12: box furnace
  Rising temperature rate: 250° C./hour
  Retention temperature: 600° C.
  Temperature retention time: 12 hours
  Atmosphere: in the air <Treatment of End Portions of Internal Electrode Layers of Sample No. 37>

Oxidation condition of end portions of the internal electrode layers 12: nitriding furnace
  Rising temperature rate: 250° C./hour
  Retention temperature: 600° C.
  Temperature retention time: 12 hours
  Atmosphere: $NH_3$ <Treatment of End Portions of Internal Electrode Layers of Sample No. 38>

The alloy condition of the end portions of the internal electrode layers 12 was sputtering. Specifically, the sputtering was conducted by targeting Cr on the end surface in the X-axis direction of the element body 3. The conditions were as below.
  Current value: 40 mA
  Sputtering time: 60 s×3 (3 times)

Thereafter, a Ni—Cr non-conductor coating was formed by performing the same heat treatment as the treatment conditions of the end portions of the internal electrode layers 12 of sample No. 36.

TABLE 7

| Example 5 Sample number | Nonconductive portion | Width $WU_a$ of nonconductive potion (μm) | $td_a$ (μm) | CV value | Q value | Insulation resistance defective rate | Insulation breakdown voltage defective rate |
|---|---|---|---|---|---|---|---|
| 36 | Oxide | 5.4 | 0.8 | 0.314 | 0.042 | ◯: 10% | ⊚: 1% |
| 37 | Nitride | 4.6 | 0.8 | 0.314 | 0.042 | ◯: 9% | Δ: 18% |
| 38 | Ni—Cr alloy | 4.4 | 0.8 | 0.314 | 0.042 | ◯: 8% | Δ: 16% |

It was confirmed from sample No. 36 to sample No. 38 that the insulation resistance defective rate and the insulation breakdown voltage defective rate were favorable in spite of thinning of the inner dielectric layer when the nonconductive portion was an oxide (sample No. 36), the nonconductive portion was a nitride (sample No. 37), and the nonconductive portion was a Ni—Cr alloy (sample No. 38). With respect to sample No. 36 to sample No. 38, the presence of the nonconductive portion strengthens the adhesion between the insulating layer and the element body and prevents breakdown voltage from occurring.

It was confirmed that the insulation breakdown voltage defective rate was favorable when the nonconductive portion was an oxide (sample No. 36), compared with when the nonconductive portion was a nitride (sample No. 37) and the nonconductive portion was a Ni—Cr alloy (sample No. 38).

INDUSTRIAL APPLICABILITY

As described above, the multilayer electronic component according to the present invention is useful as an electronic part to be used in laptop computers or smart phones which are often used to have a great capacity while being compact.

EXPLANATIONS OF LETTERS OR NUMERALS 2, 102 . . . multilayer ceramic capacitor
3 . . . element body
4 . . . ceramic sintered body
6 . . . first external electrode
8 . . . second external electrode
10 . . . inner dielectric layer
10a . . . inner green sheet
11 . . . exterior region
11a . . . outer green sheet
12 . . . internal electrode layer
12A, 12B . . . lead portion
12a . . . internal electrode pattern layer
13 . . . interior region
13a . . . internal laminate
14 . . . capacity region
15A, 15B . . . lead region
16 . . . insulating layer
16a . . . insulating layer extension portion
18 . . . nonconductive portion
20 . . . step absorbing layer
32 . . . gap between internal electrode pattern layers
104 . . . substrate
106 . . . rod

The invention claimed is:

1. A multilayer electronic component comprising an element body having internal electrode layers and dielectric layers, both of which are substantially parallel to a plane including a first axis and a second axis and are alternately laminated along a third axis direction, wherein a pair of side surfaces facing each other in the first axis direction of the element body is respectively equipped with an insulating layer, a pair of end surfaces facing each other in the second axis direction of the element body is respectively equipped with an external electrode electrically connected to the internal electrode layers, end portions in the first axis direction of the internal electrode layers are recessed at predetermined retraction distances from end portions in the first axis direction of the dielectric layers to an inner side along the first axis direction, the retraction distances are varied at a predetermined range in each layer of the internal electrode layers, and a CV value is 0.023 to 0.987, where the CV value denotes a variance degree of the retraction distances.

2. The multilayer electronic component according to claim 1, wherein a Q value is 0.004 to 0.300, where the $Q$ value$=td_k^2/(td_k^2+|d_{k+1}-d_k|^2)$, $td_k$ denotes a thickness of the dielectric layer between the internal electrode layer in k-th layer and the internal electrode layer in (k+1)-th layer, $d_k$ denotes a retraction distance of the internal electrode layer in k-th layer, and $d_{k+1}$ denotes a retraction distance of the internal electrode layer in (k+1)-th layer.

3. The multilayer electronic component according to claim 1, wherein the insulating layer contains Si and Ba.

4. The multilayer electronic component according to claim 2, wherein the insulating layer contains Si and Ba.

5. The multilayer electronic component according to claim 1, wherein nonconductive portions are present between end portions in the first axis direction of the internal electrode layers and the insulating layer.

6. The multilayer electronic component according to claim 5, wherein the nonconductive portions contain an oxide of an element constituting the internal electrode layers.

* * * * *